(12) United States Patent
Escuti et al.

(10) Patent No.: US 7,692,759 B2
(45) Date of Patent: Apr. 6, 2010

(54) POLARIZATION GRATINGS IN MESOGENIC FILMS

(75) Inventors: Michael J. Escuti, Eindhoven (NL); Carlos Sanchez, Eindhoven (NL); Cornelis W. M. Bastiaansen, Eindhoven (NL); Dirk J. Broer, Eindhoven (NL)

(73) Assignee: Stichting Dutch Polymer Institute, Eindhoven (NL)

( * ) Notice: Subject to any disclaimer, the term of this patent is extended or adjusted under 35 U.S.C. 154(b) by 123 days.

(21) Appl. No.: 11/816,916

(22) PCT Filed: Feb. 28, 2006

(86) PCT No.: PCT/IB2006/050615
§ 371 (c)(1),
(2), (4) Date: Dec. 7, 2007

(87) PCT Pub. No.: WO2006/092758
PCT Pub. Date: Sep. 8, 2006

(65) Prior Publication Data
US 2008/0278675 A1    Nov. 13, 2008

(30) Foreign Application Priority Data
Mar. 1, 2005    (EP)    ................... 05101529

(51) Int. Cl.
*G02F 1/13*    (2006.01)
(52) U.S. Cl. .................... 349/201; 349/96; 349/123; 359/485
(58) Field of Classification Search .............. 349/201, 349/96, 123; 359/485
See application file for complete search history.

(56) References Cited

U.S. PATENT DOCUMENTS

| | | | |
|---|---|---|---|
| 5,602,661 A | 2/1997 | Schadt et al. | |
| 5,986,740 A * | 11/1999 | Robinson et al. | ............ 349/201 |
| 6,242,061 B1 | 6/2001 | Gibbons et al. | |
| 6,243,063 B1 * | 6/2001 | Mayhew et al. | ............... 345/94 |
| 6,388,730 B1 | 5/2002 | Lindquist | |
| 6,930,750 B2 * | 8/2005 | Miyachi et al. | ............. 349/201 |

FOREIGN PATENT DOCUMENTS

| | | |
|---|---|---|
| CN | 1096807 B1 | 12/1994 |
| CN | 1391662 B1 | 1/2003 |
| WO | 0137039 B1 | 5/2001 |

OTHER PUBLICATIONS

James N. Eakin et al., Zero Voltage Freedericksz Transition in Periodically Aligned Liquid Crystals, Applied Physics Letters, vol. 85, No. 10, Sep. 6, 2004, pp. 1671-1673, American Institute of Physics.

* cited by examiner

*Primary Examiner*—Ellen Kim
(74) *Attorney, Agent, or Firm*—Thorne & Halajian, LLP

(57) ABSTRACT

A polarization grating comprising a polarization sensitive photo-alignment layer (2) and a liquid crystal composition (3) arranged on said photo-alignment layer is provided. An alignment pattern, corresponding to the polarization pattern of a hologram, is recorded in the photo-alignment layer, and the liquid crystal composition is aligned on the photo-alignment layer. As the origin for the alignment of the liquid crystal composition is a polarization hologram recorded in a photo-alignment layer, an essentially defect-free pattern can be obtained with this approach.

15 Claims, 18 Drawing Sheets

POLARIZATION GRATINGS IN MESOGENIC FILMS

TECHNICAL FIELD

The present invention relates to novel polarization gratings, as well as areas of application for such novel polarization gratings.

TECHNICAL BACKGROUND

Conventional diffraction gratings operate by periodically modulating the phase or amplitude of light propagating through them, potentially splitting incident light into multiple diffraction orders.

Polarization gratings, which periodically modulate the polarization state of light traveling through them, have been known since the 1970s, when initial publications about the more general case of polarization holograms appeared in Soviet journals.

It was soon recognized that the most compelling advantage of polarization gratings over conventional diffraction gratings was the possibility to control the polarization state of the diffracted orders while at the same time making the efficiency in each order dependent on the polarization of the incident light. Initial success at reducing the theory of polarization gratings to practice came in photochromic silver-chloride (AgCl) glass using holography. In this approach, two nearly orthogonally polarized coherent laser beams were superimposed with nearly parallel propagation, creating a standing optical wave with a periodic modulation of the polarization state while maintaining a constant intensity. Since linearly polarized light induced considerable optical anisotropy (linear birefringence) in the materials through the Weigert-effect, the periodic patterns, where polarization is changing from linear to circular and back, were captured as a polarization grating.

This holographic method eventually made a substantial advance when organic materials containing azobenzene moieties were shown to be able to record these polarization holograms as a relatively strong birefringence. In these materials, the azobenzene groups undergo a reversible trans=>cis=>trans isomerization process and an associated orientational redistribution of the chromophores. Research has shown that a variety of azo-containing polymers and also dispersions may also be used.

In many of these polymers, a surface relief grating is also formed during irradiation. Although the primary reason of the surface generation process is not well understood, several theories have tried to explain the existing phenomenology, and it is agreed that the surface relief appears a result of a mass diffusion mechanism. While it can be useful, this surface relief structure diffracts as a phase grating, and does not lead to a modulation of the polarization state of light propagating through it. In fact, this surface relief grating often degrades the unique diffraction properties of polarization gratings since the properties of both are superimposed. Azo-containing materials are colored in the visible so the range of wavelength applicability is limited. In addition, the long-term stability is usually limited, especially when the grating is exposed to light in the absorption band of the material or subject to high temperature thermal treatments common in applications such as LCD manufacturing.

Other materials have also been studied as alternative polarization hologram materials, including bacteriorhodopsin, holographic polymer dispersed liquid crystals, and a porous glass system imbibed with an azobenzene liquid crystal molecule. Lithographic processing of sub-wavelength metal-stripe structures has also been shown to successfully form a polarization grating by inducing a spatially periodic anisotropic absorption. In this approach, a conductive layer on a substrate is patterned into parallel lines with a sub-wavelength pitch (creating a linear polarizer), where the orientation of these lines determines the transmission/absorption axis of the polarizer. This orientation is varied periodically by the lithography at a pitch greater than the wavelength, forming the polarization grating.

This type of grating operates at infrared wavelengths, but the principle also valid at visible wavelengths (but the fabrication is more difficult since the dimensions are substantially smaller). While good optical quality can be achieved, it is an absorbing optical element (typically 50% of incident light is absorbed) and the fabrication process requires substantial photolithographic processing such as is used for semiconductor wafers (clean room environment, expensive shadow masks, photoresist development, wet chemical etching of inorganic conductive layers, etc.).

One recent method for the production of polarization gratings based on liquid crystals is described by Eakins et al, "Zero voltage Freedericksz transition in periodically aligned liquid crystals", Applied Physics Letters 85, no 10, pp 1671-1673, 2004, using a holographic exposure to photo-polymerize a polarization sensitive alignment layer, and aligning a liquid crystal composition there on.

However, there still remains a need for new high quality polarization gratings that are easy to produce, temperature stable and useful in practical applications.

SUMMARY OF THE INVENTION

One object of the present invention is to overcome the above-mentioned problems of the prior art and to provide polarization gratings which are easy to produce and which exhibits high diffraction efficiency, transparency in visible/IR wavelengths, moderate to large useable areas, stability when exposed to moderate temperatures and visible light, and flexible design features.

The inventors have surprisingly found that a polarization grating fulfilling this object could be produced by using a polarization hologram, recording its polarization pattern in a photo-alignment film, and aligning a liquid crystal composition on the photo-alignment film.

Thus, in a first aspect, the present invention provides a polarization grating comprising a polarization sensitive photo-alignment layer, for example arranged on a substrate, and an integral liquid crystal composition arranged on said photo-alignment layer. The pattern corresponding to the polarization pattern of a hologram is arranged (recorded) in the photo-alignment layer, such as in form of an anisotropic pattern of chemical bonds. A liquid crystal composition is arranged on the alignment layer, with the result that the local mesogens director of the liquid crystal composition adjacent to the alignment layer follows the anisotropic pattern, i.e. the directors of the mesogens, and thus the local optical axis, will follow the polarization pattern of the hologram. Due to the nature of liquid crystal materials, the orientation of the mesogens adjacent to the surface of the alignment layer will propagate through the thickness of the liquid crystal composition to produce a transparent film with patterned high value anisotropy and birefringence.

As the origin for the patterned birefringence is a polarization hologram recorded in a photo-alignment layer, an essentially defect-free pattern can be obtained with this approach.

The patterned orientation of the birefringence results in a very strong diffraction as a polarizing grating.

In embodiments of the present invention, the alignment direction of the anisotropic alignment pattern is periodic along at least one line in the plane of the alignment layer.

In embodiments of the present invention, the alignment direction exhibits a periodical variation which over one period corresponds to the polarization direction variation along a circle on the Poincaré sphere.

As the anisotropic pattern corresponds to a hologram with constant intensity and a periodically changing polarization profile, this pattern is most conveniently mapped onto the Poincaré sphere. One of the surprising discoveries during the pursuit of this invention is that an alignment pattern corresponding to any circle on the Poincaré sphere may be created by holographic methods, allowing polarization gratings to be created which diffracts light into any desired set of orthogonal polarizations, including linear, circular and/or elliptical polarizations.

In embodiments of the present invention, the liquid crystal composition may comprise a polymerizable compound, such as for example polymerizable mesogens or polymerizable non-mesogenic compounds.

In embodiments of the present invention, a polymerizable liquid crystal composition may be at least partly polymerized to form a solid film from the liquid crystal composition. In embodiments of the present invention, a polarization grating may comprise a liquid crystal composition as described above, sandwiched between and aligned by two alignment layers. In other embodiments, the polarization grating may comprise of a first liquid crystal composition arranged on an alignment layer and a second liquid crystal composition arranged on aligned by the first liquid crystal composition. In addition, a third liquid crystal composition may be arranged on the second liquid crystal composition, and so on.

In embodiments of the present invention, the liquid crystal composition may comprise additional functional compounds, such as different type of dyes and particles having anisotropic shape and/or spectral properties. Such compounds may be oriented in the composition by the mesogens, and thus confer additional, for example optical, properties to the polarization grating.

In embodiments of the present invention, a polarization grating may comprise means for establishing an electric and/or magnetic field in said liquid crystal composition, such as for example electrodes. As the orientation of mesogens may be affected by such a field, the optical properties may also be affected, providing a switchable grating.

The present invention also relates to broadband polarization gratings having a broader wavelength interval with high efficiency transmission. Such broadband polarization gratings may be an attractive alternative to conventional polarization gratings.

The present invention also relates to display devices comprising polarization gratings of the present invention as optical switches. Switches of this type may operate on unpolarized light, obviating the use of polarizers and thus, enabling the potential for a very high overall optical efficiency.

The present invention also relates to beam-splitters based on polarization gratings, where a high diffraction angle may be obtained without the need for a small grating pitch.

The present invention also relates to new polarizers comprising polarization gratings of the present invention. Such polarizers have the ability to convert unpolarized light into polarized light at efficiencies markedly higher than 50%.

The present invention also relates to security arrangements comprising polarization gratings.

BRIEF DESCRIPTION OF THE DRAWINGS

The present invention will now be described further by the following preferred embodiments with reference to the accompanying drawings, in which:

FIG. 1 illustrates two different setups of orthogonally polarized superimposed beams, and the resulting polarization pattern.

DETAILED DESCRIPTION OF PREFERRED EMBODIMENTS

Figure 3A:
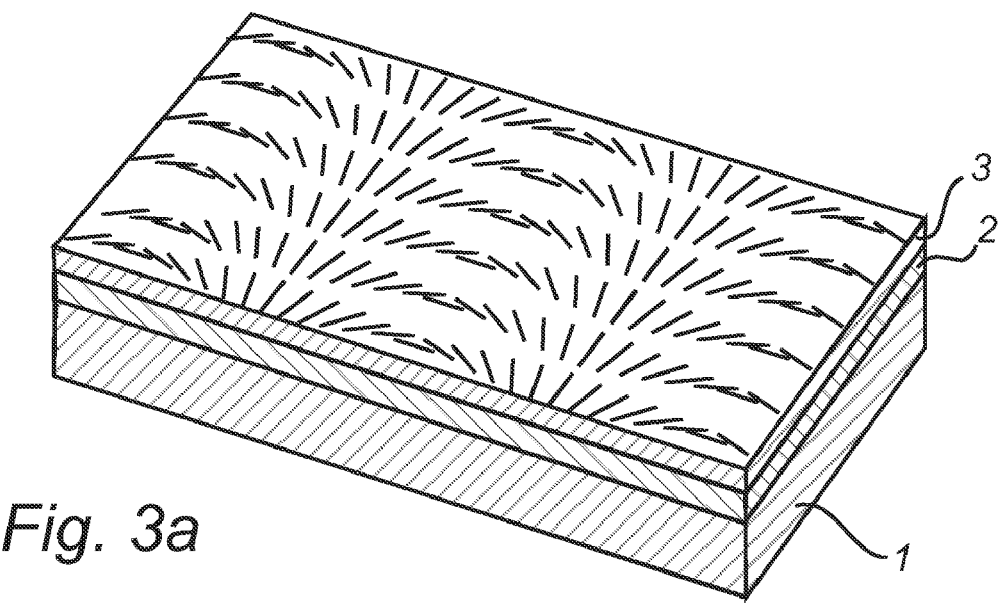
FIG. 3a illustrates schematically an embodiment of a polarization grating according to the present invention.

One embodiment of a polarization grating of the present invention is shown in FIG. 3a. The polarization grating of this embodiment comprises a substrate 1 on which a polarization sensitive photo-alignment layer 2 is arranged.

Figure 1A:
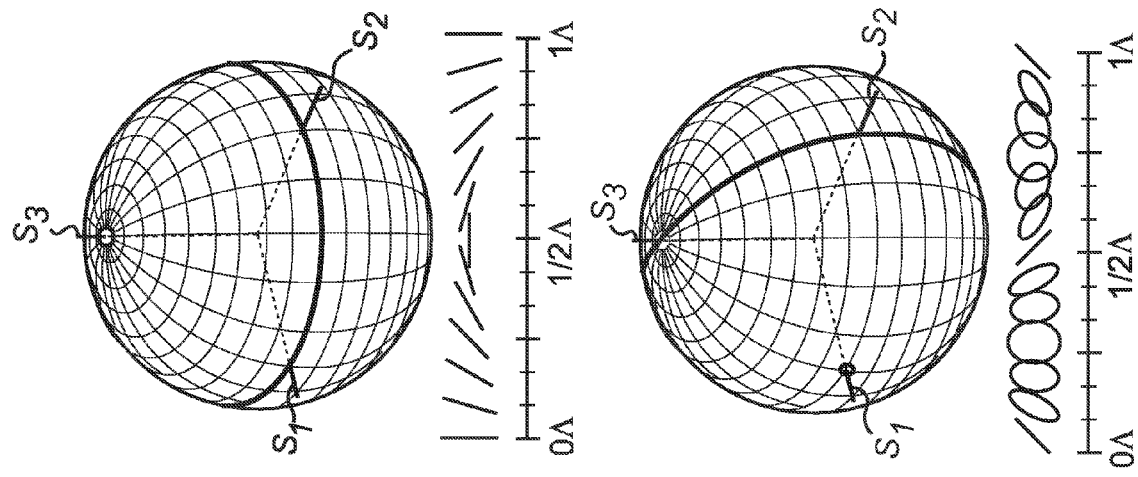
FIG. 1a: A left and a right hand circularly polarized beam.
Figure 1B:
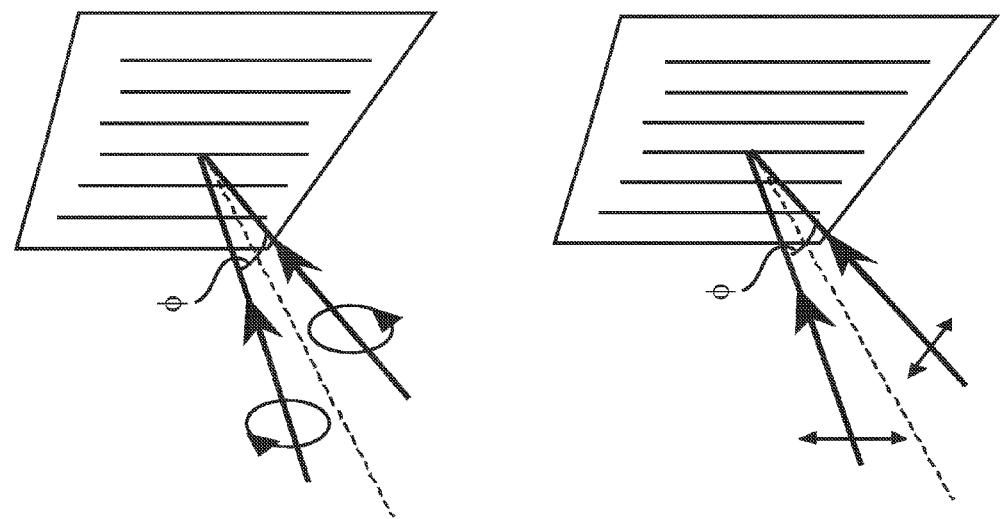
FIG. 1b: A vertical and a horizontal linearly polarized beam.

In the photo-alignment layer, an anisotropic pattern corresponding to a polarization hologram is recorded as an anisotropic pattern of chemical bonds within the polymer constituting the photo-alignment layer (see for example FIGS. 1a and 1b).

On the photo-alignment layer 2, a liquid crystal composition 3 is arranged. The mesogens located adjacent to the surface of the photo-alignment layer will orient themselves along the anisotropic pattern in the photo-alignment layer.

Thus, the directors of the liquid crystal mesogens located adjacent to the surface of the photo-alignment layer 2 will be oriented in the direction of the polarization in each position of the polarization hologram.

Due to the nature of liquid crystal composition 3, the patterned director arrangement will propagate through the composition to form a transparent film with a patterned anisotropy and birefringence, giving as a result the optical properties of a polarization grating.

Herein the terms "mesogen" and "liquid crystal" are used to indicate materials or compounds comprising one or more mesogenic groups, such as (semi)rigid rod-shaped, banana-shaped, board shaped or disk-shaped mesogenic groups, i.e. groups with the ability to induce liquid crystal phase behavior. Liquid crystal compounds with rod-shaped or board-shaped groups are also known in the art as "calamitic" liquid crystals. Liquid crystal compounds with a disk-shaped group are also known in the art as "discotic" liquid crystals. Compounds or materials comprising mesogenic groups do not necessarily have to exhibit a liquid crystal phase themselves. It is also possible that they show liquid crystal phase behavior only in mixtures with other compounds, or when the mesogenic compounds or materials, or the mixtures thereof, are polymerized.

As used herein, the term "liquid crystal composition" refers to a composition which comprises mesogens and which exhibits liquid crystal phase behavior.

The substrate 1 on which the photo-alignment layer 2 is arranged may be any rigid or flexible substrate. Examples of suitable substrates include, but are not limited to, glass, transparent ceramic, fused silica, transparent polymers which may be thermosetting or thermoplastic and (semi)-crystalline or amorphous, such as PC (polycarbonate), PMMA (polymethylmethacrylate), PET (polyethylene terephthalate), PVC (polyvinylchloride), PS (polystyrene), (polycarbonate), COC (cyclic olefin copolymers), PET (polyethylene terephthalate), PES (polyether sulphone) and also crosslinked acrylates, epoxies, urethane and silicone rubbers.

Other suitable substrate materials include reflective substrates, such as metallic substrates, e.g. silver and aluminum, etc., and semiconducting substrates, e.g. silicon, etc. Additional substrate materials will be apparent to those skilled in the art.

The alignment layer 2 may be arranged on the substrate 1 by known methods, such as spin coating, doctor blade coating, casting, etc, to form a thin film on the substrate.

Polarization sensitive photo-alignment layer materials are well known in the art and include, for example, linearly photo-polymerizable polymers, such as those commercially available from Rolic, Vantico and Huntsman, and similar materials available from JSR and LG Cable.

Alternatively, azo-containing materials, as described above, could also be used as an alignment layer, as these could both record the polarization pattern and align mesogens to the polarization pattern.

To obtain the anisotropic alignment pattern in the photo-alignment layer, two or more coherent and orthogonal polarized laser beams (linear, elliptical, or circular polarizations) may be superimposed on the alignment layer, leading to a spatially periodic variation in the polarization of the light.

The basic theory for this is known, for example, from Nikolova et al, Optica Acta 31, 579 (1984).

The case of two orthogonally circular polarized superimposed beams yields a one-dimensionally spatially extending periodic "rotating" pattern in linear polarization, where the polarization pattern in each period is represented by a great-circle (where S3=0) around the equator of the Poincaré sphere (see FIG. 1a).

The case of two orthogonally linear polarized superimposed beams yields a one-dimensional periodic spatially pattern composed of a variety of polarizations, including linear, circular, and elliptical, where the polarization pattern in each period is represented by a great-circle around the Poincaré sphere (where S1=0) which travels through the poles and the points representing the polarization of the two superimposed beams (see FIG. 1b).

The general case of two orthogonally elliptical polarized superimposed beams yields a one-dimensional spatially periodic pattern composed of a variety of polarizations, which may generally be chosen in such a way to correspond to any circle on the Poincaré sphere. When the two beams have the same intensity, then the hologram maps to a "great-circle" on the sphere. When the two beams have unequal intensities, the hologram maps to any circle on the sphere.

When a liquid crystal composition is arranged on the alignment layer, the mesogens in the composition will align to the alignment pattern, forming a birefringent grating where the optical axis close to the alignment layer, i.e. the director of the mesogens adjacent to the alignment layer, follows the alignment pattern. The director pattern propagates through the layer in a manner that is specific for the liquid crystal composition used. For example, in a cholesteric liquid crystal composition, the director pattern will twist with the distance from the alignment layer and at any distance from the alignment layer, the director pattern is still present, however twisted at an angle defined by the pitch of the liquid crystal composition.

In general, the diffractive properties of such gratings are such that the diffracted orders are polarized with the same polarizations as the orthogonal beams that formed the hologram.

The period ($\Lambda$) of this polarization pattern is determined by the wavelength of the laser beams ($\lambda$) and the angle ($\phi$) separating the coherent superimposed beams according to the following formula:

$$\Lambda = \lambda/(2*\sin(\phi/2)) \quad (I)$$

Two-dimensional (2D) polarization patterns, i.e. where the polarization pattern exhibits a periodic spatially rotating pattern both in both dimensions of the plane, may be formed in several different ways, including a "one-step"-method and a "sequential" method. In either case, this type of grating is interesting and useful since the diffracted orders are polarized according to the beams that formed the hologram (just as in the above discussed one-dimensional case).

Sequential formation will be discussed first since it is the most intuitive and known in prior art, followed by an explanation of the "one-step" formation that is not in prior art to our knowledge.

In a sequential method, a one-dimensional (1D) grating is formed in as described above (by interfering two orthogonal coherent beams), after which the substrate is rotated by a chosen angle (e.g. 90°). Subsequently, a second exposure is performed (with the same or different two orthogonal coherent beams) which results in a second 1D grating being superimposed on the first. This may be repeated as many times as desired (H. Ono et al., Opt. Exp. 11, 2379-2384 (2003)).

One advantage of this method is that the same setup which created the 1D polarization grating can be used to create a 2D polarization grating. However, many interesting 2D polarization patterns cannot be formed in this way, and in many instances, the subsequent recordings degrade the quality of the previous recordings. Also, in some cases (R. C. Gauthier and A. Ivanov, *Opt. Expr.* 12, 990-1003 (2004)), the rotation stage requires exceedingly stringent positioning/rotation requirements.

An alternative approach to provide 2D polarization gratings is through a single step formation. This is done by superimposing three or more coherent laser beams with propagation and polarization parameters chosen such that a constant or almost constant intensity pattern results. For example, the interference pattern from three superimposed coherent beams can be described by the following formula:

$$I(x,y)=1+V12*\cos(G_{12X}*x+G_{12Y}*y)+V23*\cos(G_{23X}*x+G_{23Y}*y)+V31*\cos(G_{31X}*x+G_{31Y}*y) \quad (II)$$

where the constants $G_{\#\#X}$ and $G_{\#\#Y}$ are related to the propagation vectors of the coherent beams, and where the constants $V\#\#$ are determined by the polarization and propagation parameters. Details on this expression for 2D intensity gratings are found in M. J. Escuti and G. P. Crawford, *Opt. Eng.* 43, 1973-1987 (2004). The condition for 2D polarization gratings is that I(x,y) is a constant. This occurs when the derivative in of the function is zero:

$$dI(x,y)/dx=dI(x,y)/dy=0 \quad (III)$$

Figure 2:
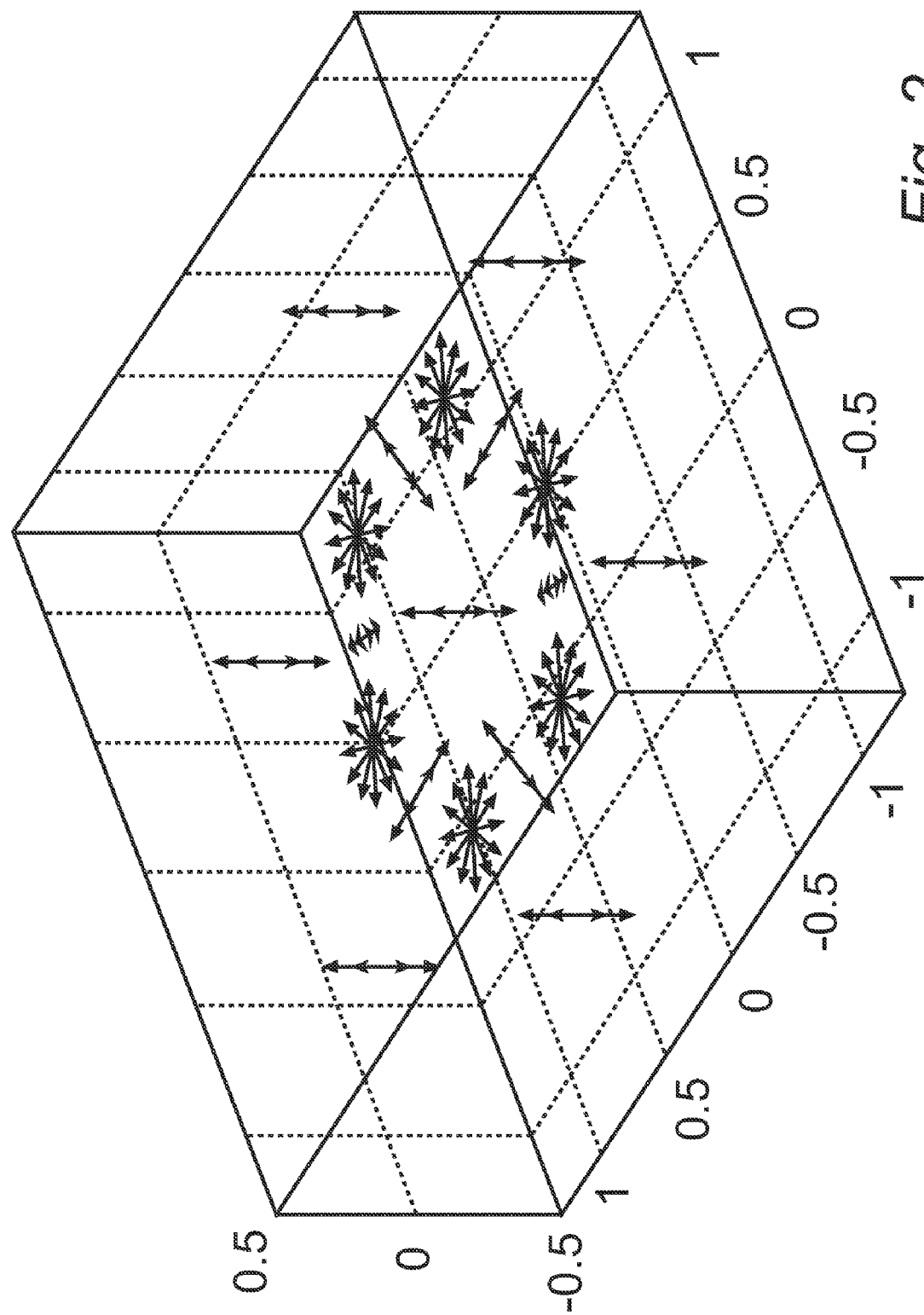
FIG. 2 illustrates an anisotropic polarization pattern that is spiraling repeating in two dimensions.

Under this condition, a 2D polarization pattern results. A representative example is shown in FIG. 2, determined by the following parameters: angle of incidence=~35.3° and all beams with transverse-magnetic (TM) polarizations.

The superimposed beams induces polymerization in the photo-alignment layer, and the polarization of the light determines the direction of the cross-linking bonds, thus capturing the polarization features of the pattern into an arrangement of anisotropic chemical structures. This arrangement of structures is able to align a liquid crystal mixture arranged thereon.

The pitch, i.e. the period (Λ), of the polarization pattern may for example be in the range of from 0.2 to 100 μm (10 to 5000 periods per mm), such as from 0.4 to 25 μm (40 to 2500 periods per mm).

In general, laser beams of any wavelength could be used to record the polarization pattern in the alignment layer, and the wavelength (λ) is preferentially in the range of from 157 nm to 1064 nm.

From the formula (I), it is apparent that the angle (φ) separating the angle of incidence of the coherent superimposed beams is dependent on the desired pitch (Λ) and the wavelength (λ). Virtually any angle 0°<φ<180° may be used to produce the desired pitch.

A liquid crystal composition 3 is arranged on the photo-alignment layer 2. Examples of mesogens suitable for use in the present invention include smectic, nematic, chiral nematic and ferro-electric mesogens.

The mesogen can be a reactive mesogen or a non-reactive mesogen.

Examples of suitable non-reactive mesogens include for example such mesogens as available from Merck, for example as described in their product folder Licristal® Liquid Crystal Mixtures for Electro-Optic Displays (May 2002) whose contents are herein incorporated by reference regarding non-reactive mesogens. Examples include for example halogenated mesogens, such as for example TL205 (Merck, Darmstadt) or cyanobiphenyls, such as for example E7 (Merck, Darmstadt). In addition, mixtures of two or more non-reactive mesogens can be used.

Examples of suitable reactive mesogens include, for example, mesogens comprising acrylate, methacrylate, epoxy, oxethane, vinyl-ether, styrene and thiol-ene groups. Suitable examples are for example described in WO04/025337 whose contents is herein incorporated by reference regarding reactive mesogens, referred in WO04/025337 as polymerizable mesogenic compounds and polymerizable liquid crystal materials. Examples include C3M, RMM34 (Merck). In addition, mixtures of two or more reactive mesogens can be used (Merck Reactive Mesogens, Brighter clearer communication).

In addition, mixtures of reactive and non-reactive mesogens can be used.

In case of a mixture, all mesogens used are preferably in an aligned state in the final layer.

Further, the liquid crystal composition may also comprise suitable surfactants to decrease the surface energy at the mesogen-air interface or between the composition and the alignment layer.

The liquid crystal composition may further comprise absorbing, fluorescent electro-luminescent dyes, and nano-/micro-particles with anisotropic shape and/or spectral properties to add additional functionality to the polarization grating. Particularly, the liquid crystal composition may comprise such dyes that are dichroic and that align with the orientation in the liquid crystal composition.

When dichroic dye molecules having anisotropic absorption coefficients, such as G205 (see below), are added to the liquid crystal mixture, their alignment will follow the director pattern.

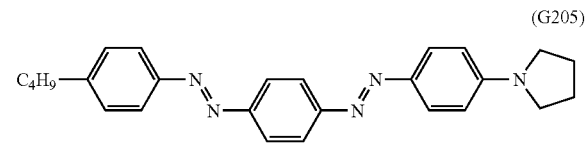

(G205)

At the microscopic level, the dichroic dye acts as a linear polarizer, effectively passing one linear polarization while absorbing the other. At the macroscopic level in a polarization grating (e.g. one formed by orthogonal circularly polarized beams), the dichroic dye molecules follow the spiraling nematic director configuration. The resulting film is an embodiment of a Stokes parameter sensor proposed and theoretically analyzed by F. Gori (supra), at least within the bandwidth of strong anisotropic absorption of the dye. Thus, the present invention also relates to a Stokes parameter sensor comprising a polarization grating of the present invention.

A nearly identical optical effect is expected from nano-/micro-particles that would also be dichroic and follow the nematic director. For example, carbon nano-tubes could be added to the liquid crystal mixture instead of an absorbing dye. In this case, the resulting Stokes parameter sensor would have a much more broad detection bandwidth since the nano-tubes have a much wider absorption band (effectively from UV through IR wavelengths). The addition of fluorescent molecules into the liquid crystal mixture allows a further functionality, namely that of lasing.

Liquid crystal polarization gratings are however, due to the nature of liquid crystals, temperature sensitive. At temperatures above the clearing temperature for the liquid crystal composition, the orientational and positional order is disrupted, and the composition goes into an isotropic phase where the polarization properties are lost.

Thus, it may for this and for other reasons as well, be desired to obtain a solid film having the polarization properties of the above mentioned liquid crystal polarization grating.

In order to form a solid film polarization grating, the liquid crystal composition may further comprise a polymerizable compound, which may be polymerized to lock the orientation of the mesogens. The polymerizable compound may be constituted by polymerizable mesogens, but could also be a separate, polymerizable non-mesogenic compound.

A liquid crystal composition comprising reactive mesogens may also comprise a polymerization initiator, such as a free radical initiator or a cationic agent, which may be photosensitive or thermally sensitive, i.e. the initiator is activated by light and heat, respectively. Mixtures of one or more polymerization initiators may be used.

Several different such polymerization initiators are known to those skilled in the art, and the choice of initiator will depend on the choice of polymerizable compound.

Thus, in certain embodiments of the present invention, the liquid crystal composition is polymerized or at least partly polymerized, for example by light or by heat, to form a solid film.

Figure 4:
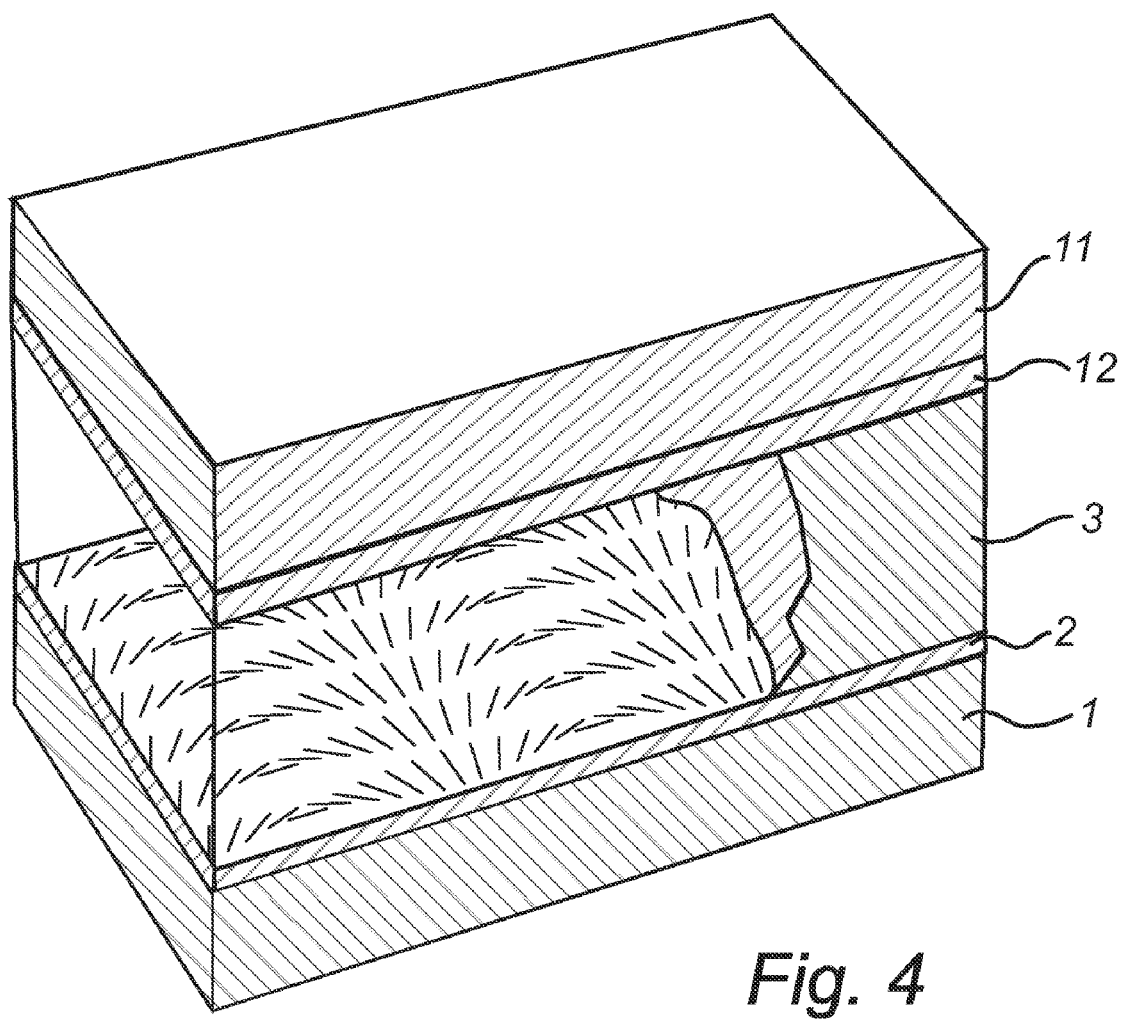
FIG. 4 illustrates schematically another embodiment of a polarization grating according to the present invention.

In a second embodiment of the present invention, as illustrated in FIG. 4, the grating comprises a cell comprised of two substrates 1, 11 equipped with polarization sensitive photo-alignment layers 2, 12 having an anisotropic alignment pattern recorded therein. The photo-alignment layers sandwiches and aligns a liquid crystal composition 3 to form a polarization grating.

To produce such an assembly, two polarization sensitive photo-alignment layers 2, 12 are provided on one substrate 1, 11 each. Using standard LCD-techniques, the two alignment layers are arranged parallel to each other, optionally with spacers to control the cell gap, and a glue seal with at least one fill opening. The substrates are arranged so that the alignment layers face each other.

A polarization hologram is recorded in both the alignment layers 2, 12 by exposing both the layers simultaneously to the same polarization hologram, where the bottom alignment layer is exposed through the top alignment layer.

To avoid reflections of the polarization hologram inside the cell, which would disturb the holographic pattern, the cell may in this step advantageously be filled with an isotropic composition, e.g. liquid, for example an organic solvent, such as cyclohexane, or an isotropic liquid crystal composition, which have a refractive index matching the refractive index of the alignment layers.

After recording the polarization hologram, the isotropic composition is removed, e.g. evaporated, from the cell, and the cell is filled with a liquid crystal composition, which aligns to the anisotropic patterns of the alignment layers.

In addition, in this embodiment of the invention, the liquid crystal composition may subsequently be at least partly polymerized. One limitation inherent to liquid crystalline materials is that mesogens far away from the alignment layer tend to be less effected by the alignment layer than the mesogens close to the alignment layer. This extent of this loss of alignment depends on many things, e.g. the characteristics of the alignment layer, such as the pattern and the chemical composition, as well as on the characteristics of the liquid crystal composition, such as the elastic constant and viscosity. Due to this, it is in general difficult to produce relatively thick holographic gratings having a small pitch with a maintained high quality polarization pattern when using a single alignment film.

In our experiments we have found that the maximum thickness of a single liquid crystal layer arranged on an alignment layer, for this type of application, is determined by the following approximate thumb-rule formula:

$$d_{max} \leq \Lambda/2 \tag{IV}$$

where d is the thickness of the layer and $\Lambda$ is the pitch of the grating. Although this is not an exact formula, it illustrates the approximate limit of the thickness of a single layer applied on a single substrate without significant degradation in the optical quality. In the design of several embodiments, it is necessary to exceed this limit in order to reach a particular optical effect.

Figure 5A:
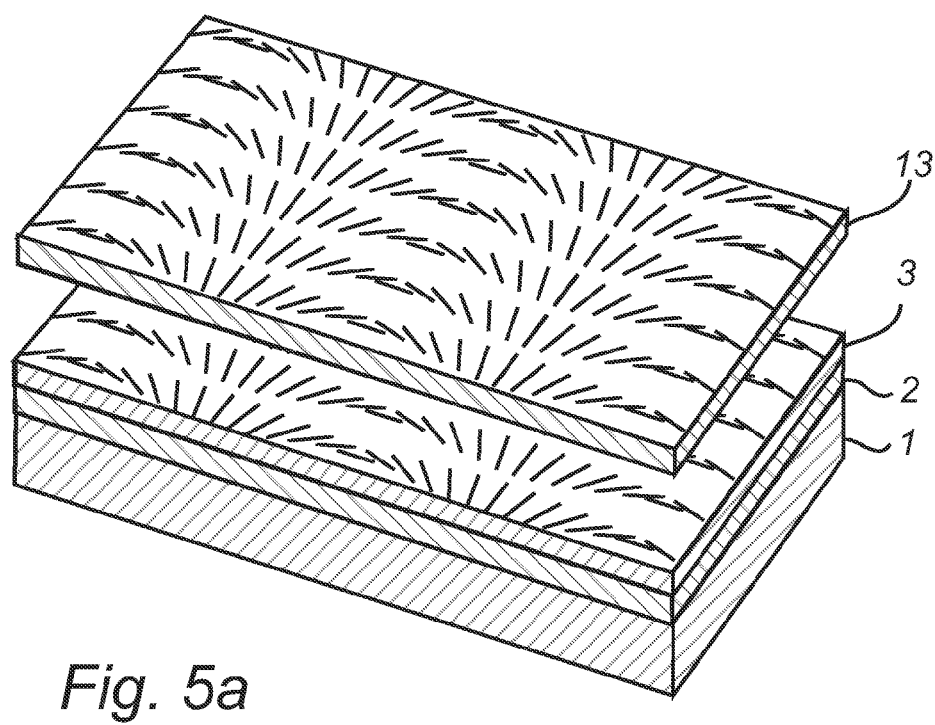
FIG. 5a illustrates schematically another embodiment of a polarization grating according to the present invention.

A further embodiment of the present invention that overcomes this limitation is illustrated in FIG. 5a and comprises several liquid crystal compositions. A first liquid crystal composition 3 is arranged on and aligned by the alignment pattern (as described above) in an alignment film 2 arranged on a substrate 1, and is then at least partially polymerized. On this first composition 3, a second liquid crystal composition 13 is arranged. The second composition 13 will now be aligned by the first liquid crystal composition 3. The inventors have surprisingly applied this principle to more than twenty layers resulting in high optical quality.

In this way, no mesogens are located far away from its alignment layer, and this allows for the manufacture of a relatively thick polarization grating having a relatively small pitch, even where $d_{total} > \Lambda/2$, via many relatively thin layers.

The above-described embodiments are illustrative only, and it will be apparent to those skilled in the art that several variants of and modifications of these embodiments are possible inside the scope of the appended claims. For example, means, such as electrodes, may be provided in order to establish an electric and/or magnetic field in the liquid crystal composition. Unless they are locked in position due to polymerization, mesogens will direct themselves to an electric or magnetic field applied over the composition. This allows for a switchable polarization grating, whose optical properties can be controlled by the application of the field. For example, a pair of patterned electrodes may be arranged in or on the substrate in a two-substrate grating of the invention as described above.

Moreover, two or more polarization gratings of the present invention may be arranged on top of each other.

One exemplary application of polarization gratings of the present invention, relates to broadband polarization gratings.

A broadband polarization grating is a grating that has high diffraction efficiency over a broad wavelength range. Another name for this is "achromatic polarization grating", since the performance of the optical element is less sensitive to wavelength variations. For an understanding of this, note that the diffraction efficiency of the basic polarization grating formed by two orthogonal circular polarized beams (FIG. 1a) is as follows (expressions are primarily from known literature, but where the S3/S0-dependence was identified by the present inventors):

$$\mathit{Eff}(0^{th}\text{ order}) = \cos^2(\Gamma/2) \tag{IVa}$$

$$\mathit{Eff}(\pm 1^{st}\text{ order}) = (\tfrac{1}{2})*\sin^2(\Gamma/2)*[1 \pm S3/S0] \tag{IVb}$$

$$\mathit{Eff}(\text{all other orders}) = 0 \tag{IVc}$$

where the phase retardation is $\Gamma = 2\pi\Delta nL/\lambda$, and the ellipticity of the incident beam is described by its normalized Stokes parameter S3/S0.

The diffraction efficiency of the first orders is highest when the phase retardation is halfwave, or in other words, when $\Gamma = \pi \pm 2\pi p$, where p is an integer. While this can easily be matched for specific wavelengths, the phase retardation has an inverse dependence on wavelength. Further, it has been shown that the birefringence $\Delta n$ of the liquid crystal layer itself depends on the wavelength (known as dispersion). For example, the reactive mesogen mixture RMS03-001 (Merck) has a birefringence that has been measured as (λ in nm)

$$\Delta n(\lambda) = 0.12 + (110/\lambda)^2 \quad (V)$$

Figure 6:
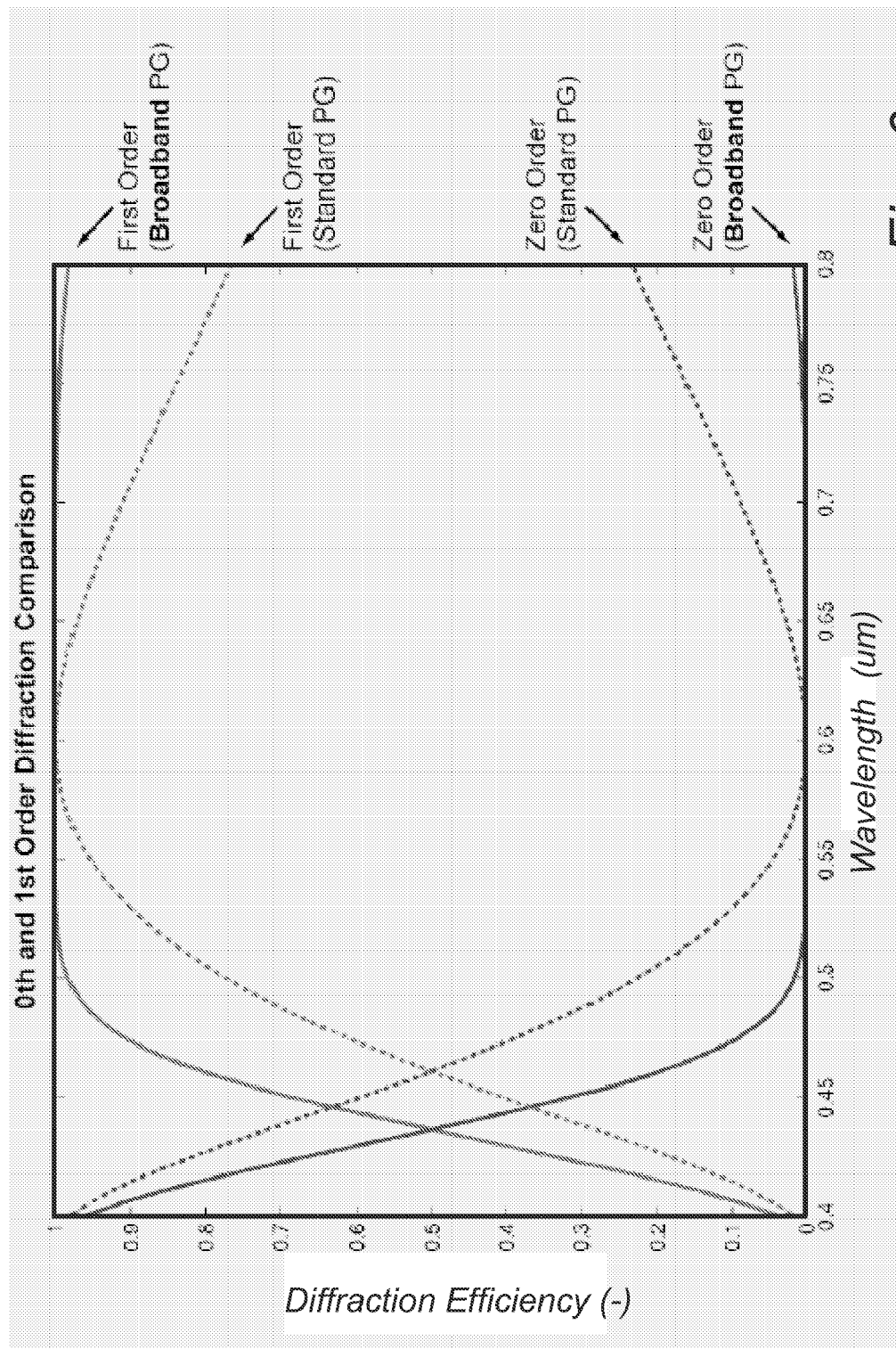
FIG. 6 illustrates the transmission curve of a standard polarizing grating and a broadband polarizing grating.

A standard polarization grating formed using a layer of this material will exhibit diffraction efficiencies as is shown in FIG. 6 (standard PG). In this Figure and throughout the following discussion regarding the broadband polarization gratings, all retardation and diffraction is optimized for reddish-orange circularly polarized incident light (λ=0.6 µm). The standard polarization grating in this Figure has a high diffraction (>99.5%) for a range of ±20 nm, or a bandwidth of 40 nm.

It is, however, often desirable to increase this bandwidth of high diffraction efficiency.

In one approach, two polarization gratings may be combined to accomplish the broadband effect.

It is known from general optics that two uniaxial anisotropic plates may be arranged in such a way as to create a broadband retardation plates used instead of one in order to broaden the operational bandwidth (e.g. S. Pancharatnam, Proc. Indian Acad. Of Sci. A 41, 130 (1955).). One example of this is two halfwave plates formed using the example material RMS03-001 from above with the birefringence Δn(λ). When arranged with an angle of 45 degrees between their optical axes (e.g. the first at 22.5° and the second at 66.5° relative to some arbitrary axis), they exhibit half-wave retardation over a broader range than if just one was used.

Applying this idea to polarization gratings, we require two identical polarization gratings (in this example formed with RMS03-001) optimized for highest diffraction at λ=0.6 µm. When they are laminated together and offset such that a difference of 45 degrees exists between the local nematic directors, a high diffraction efficiency results. The result is shown in FIG. 6 (broadband PG). The resulting polarization grating has a high diffraction (>99.5%) for a range of 510 nm to 750 nm, or a bandwidth of 240 nm. This improvement by a factor of six relative to a single layer polarization grating should allow this kind of broadband grating to be used in a greater variety of applications.

Figure 7A:
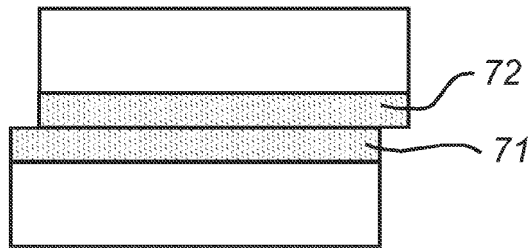
FIG. 7a illustrates a first embodiment of a broadband polarizing grating.

A first embodiment of a broadband polarization grating of the present invention is shown in FIG. 7a. Two separate single layer polarization gratings 71, 72, for example having corresponding, e.g. essentially identical, nematic alignment patterns, are aligned parallel and laminated together, however at an off-set of Λ/4 (giving an angle of 45° between superimposed nematic directors), where Λ is the grating period, common for both the polarization gratings. This leads to the superimposed in plane nematic director profile shown in FIG. 7c.

Figure 7B:
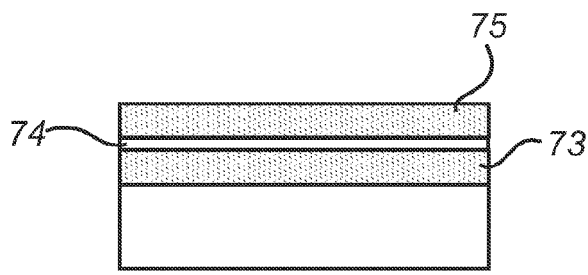
FIG. 7b illustrates a second embodiment of a broadband polarizing grating.
Figure 7C:
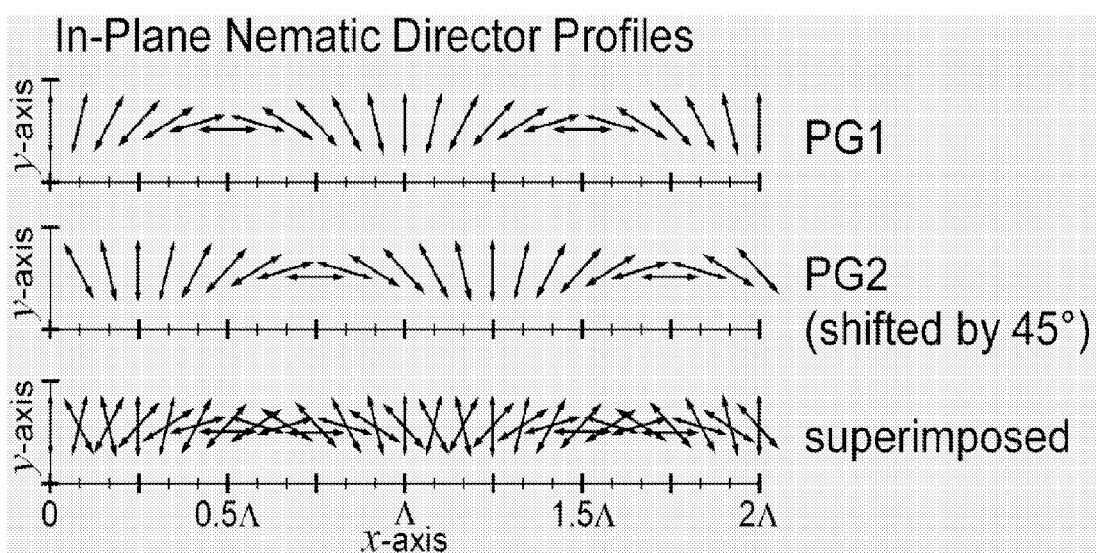
FIG. 7c illustrates the anisotropic director pattern of a broadband polarizing grating.

A second embodiment of a broadband polarization grating of the present invention is shown in FIG. 7b. A first mesogen composition 73 is aligned on an alignment layer having the desired anisotropic polarization pattern recorded therein. This first layer is then polymerized, and thereon, a second, thin chiral mesogen composition 74 having tight pitch exhibiting a ~45° twist (such as for example LC756, BASF) is arranged and aligned by the underlying first mesogen composition 73. In addition, this second, thin, chiral mesogen composition 74 is then polymerized. On top of the chiral mesogen layer 74, a third mesogen composition 75, for example of the same material as used in the first mesogen composition 73 is arranged on, and aligned by, the second, chiral, mesogen composition 74, where after also this third mesogen layer 75 is polymerized. This yields a single substrate, fully-polymerized grating is formed, where the nematic director profile of the third mesogen composition is off-set by an angle of 45°, due to the twist in the chiral layer, as compared with the nematic director profile of the first mesogen layer (FIG. 7c).

The offset value between the two polarization gratings in a broadband polarization grating of the present invention is preferably 45° (or Λ/4) as the maximum broadening of the useful wavelength range is obtained at 45°. However, a range broadening effect is seen also at offsets higher or lower than 45°, such as in the range between 30 and 60°.

Another exemplary application of polarization gratings of the present invention is as an optical switch, for example for use in LCD-displays, such as direct view displays and projection displays.

This type of optical switch involves a non-polymerized polarization grating of the present invention of the above-discussed embodiment shown in FIG. 4 and means for applying an electrical field over the mesogen layer in order to influence the tilt of the nematic directors of the mesogen layer.

For the understanding of such an optical switch, it is important to recognize the essential switching properties of the liquid crystal polarization grating used. Consider a switchable polarization grating with a repeating spiraling nematic director pattern, optimized for ½-wave retardation at λ=0.610 µm, which means that the $0^{th}$ order transmittance is approximately zero and all the light (polarized or non-polarized) is diffracted into the first two orders (±1). Using the equations (IV a-c) previously described, the 0V transmission spectrum for this case is shown in FIG. 8 for a representative liquid crystal E7 (Merck, Δn~0.2217@0.610 µm), where a thickness of L=2.06 µm is needed to achieve the ½-wave retardation at 610 nm.

When a voltage V>0, is applied to this mesogen layer, the local retardation is reduced, that is, Δn(V)*L<Δn(0V)*L.

Figure 8:
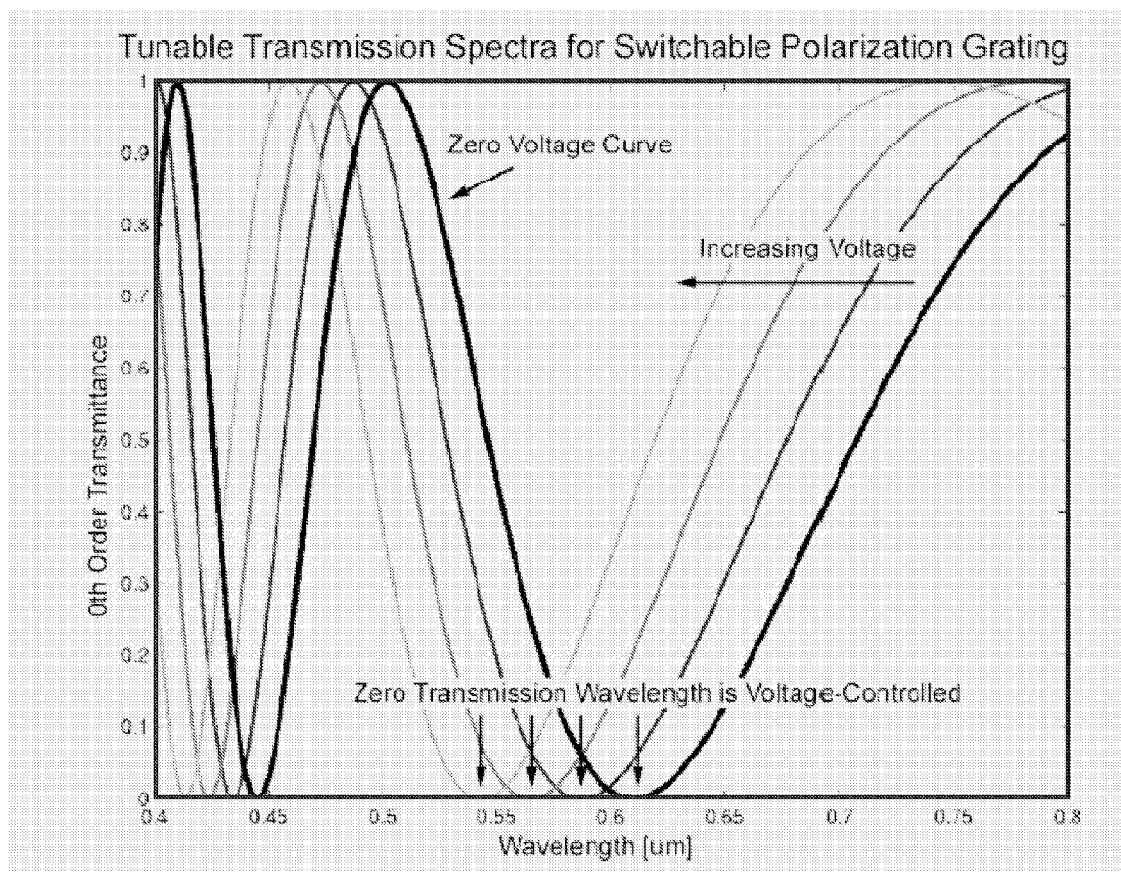
FIG. 8 illustrates the transmission curve for a polarization grating vs. applied voltage.

As a result, the transmission spectrum changes, as shown in FIG. 8, and allows for the zero- and full-transmittance wavelengths to be electrically controlled across the entire visible range. This is in contrast to most LCD designs involving a grating, where application of a voltage merely reduces the diffraction efficiency without changing the profile of the transmission spectrum.

Figure 9A:
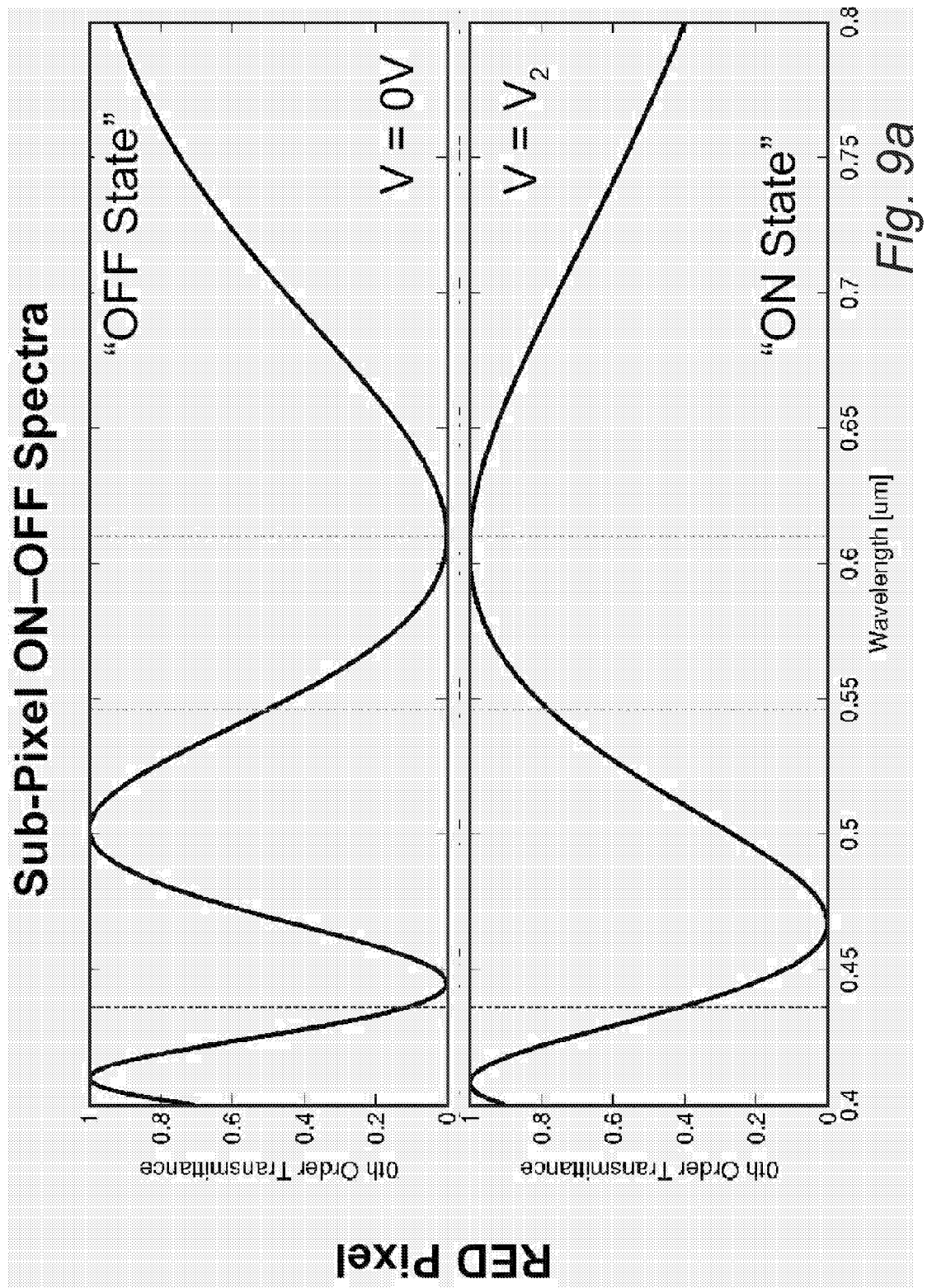
FIG. 9 illustrates transmission curves of a polarization grating optimized for red (FIG. 9a), green (FIG. 9b) and blue (FIG. 9c) light, respectively.
Figure 9B:
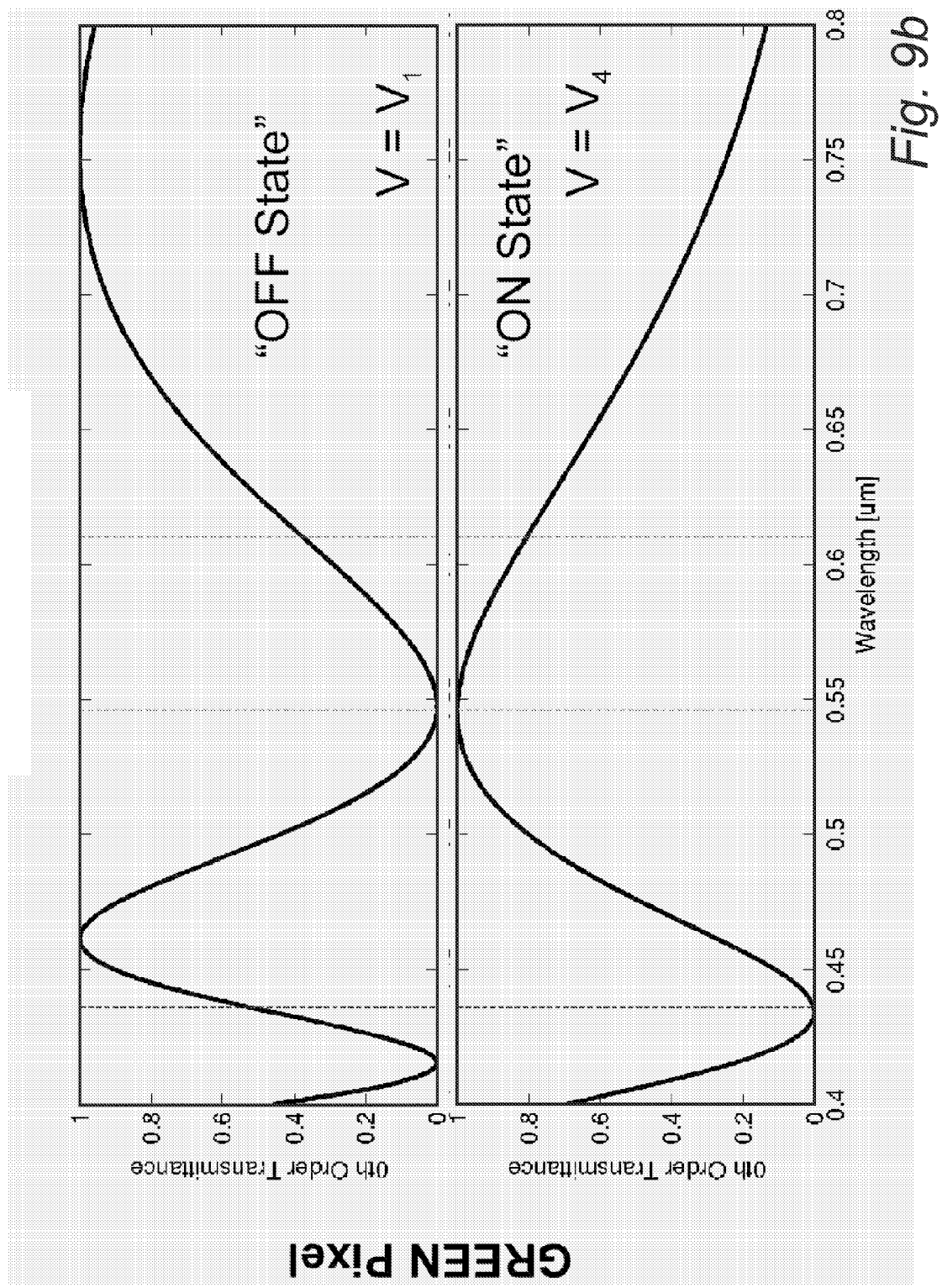
Figure 9C:
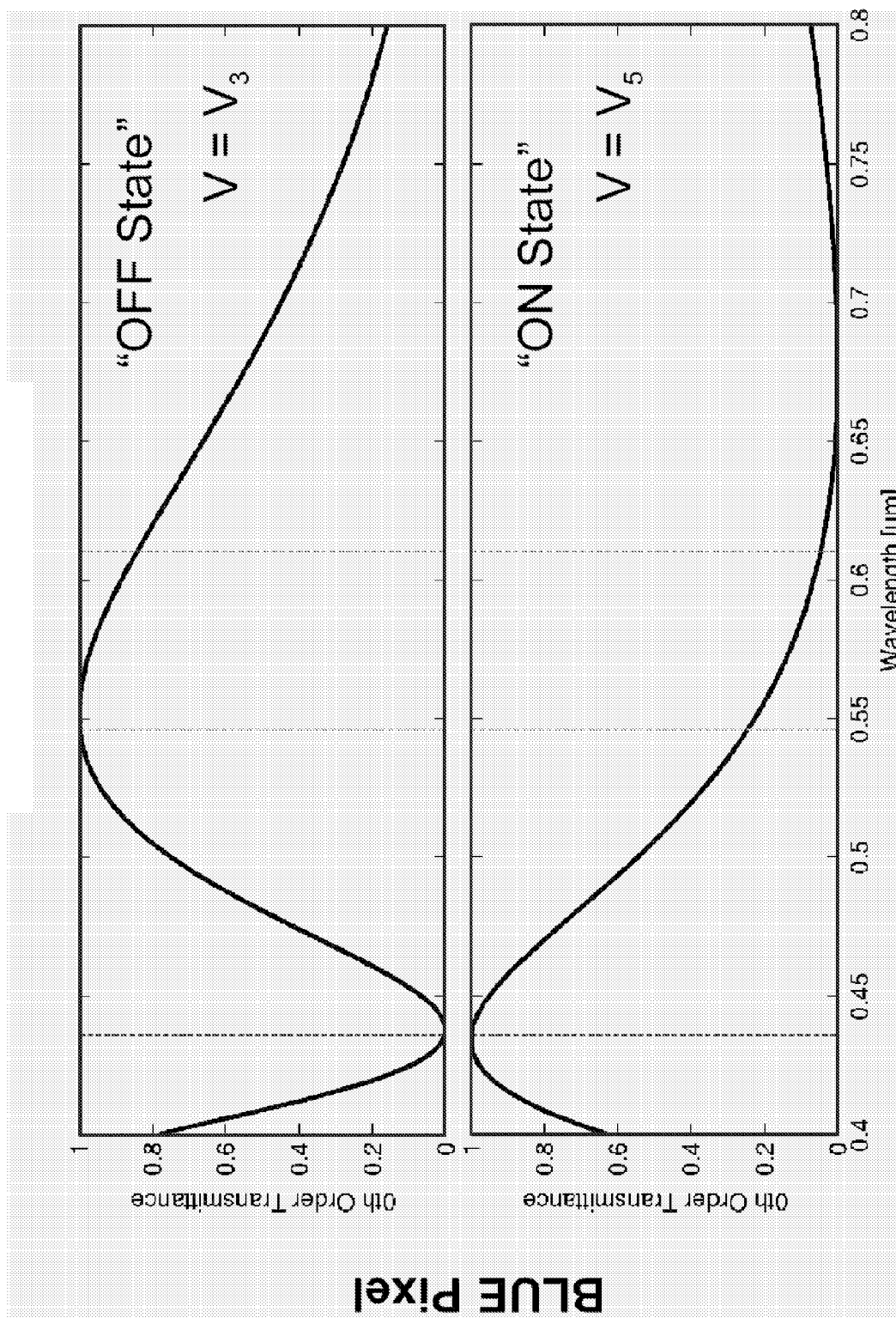

One application of this effect will now be described, and is shown in FIG. 9a-c. For any certain wavelength, here exemplified by the colors blue (436 nm), green (546 nm) and red (610 nm), the voltage V may be chosen such that either the zero-order transmittance is maximized and the first-order diffraction is minimized (ON-value) or the zero-order transmittance is minimized and the first-order diffraction is maximized (OFF-value).

For each color, the ON state allows ideally passes 100% of the unpolarized light and the OFF state allows ideally ~0% of the light. Note that for these calculations, 0V<V1<V2<V3<V4<V5, and that {V1,V2,V3,V4,V5} are voltages that lead to retardation values {0.86, 0.66, 0.58.0.57, 0.38}*Δn(0V)*L.

Thus, by properly choosing the voltage, it is possible to determine whether light passing through the grating will exit in the direction of the normal ($0^{th}$ order transmittance maximized) or the direction of the first diffraction orders (±$1^{st}$ order transmittance maximized).

This electro-optical effect may for example be used in LCD-displays.

Figure 10:
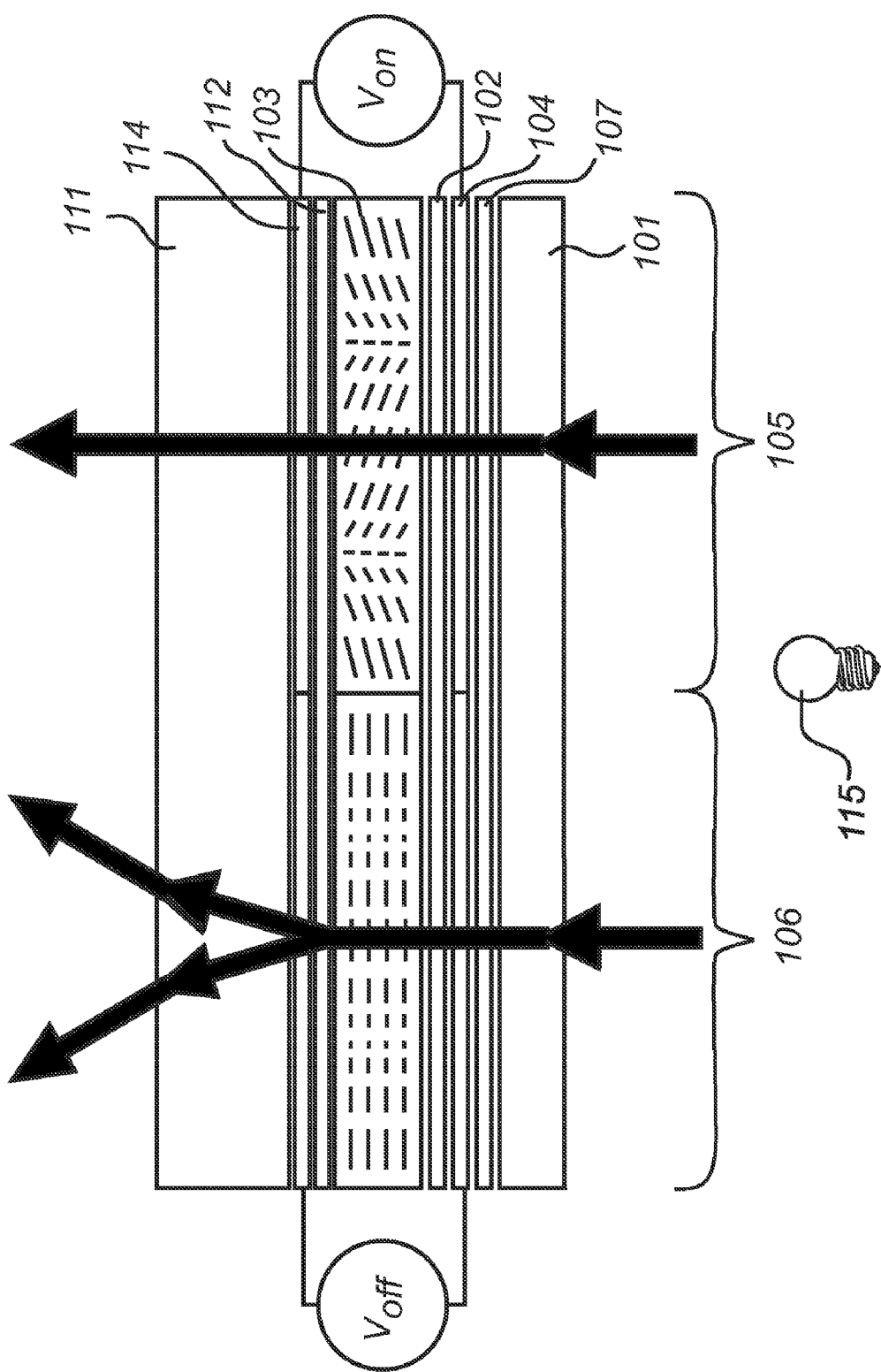
FIG. 10 illustrates a display device comprising a polarization grating of the invention.

A first embodiment of an LCD-element is shown in FIG. 10, and comprises a polarization grating comprising a non-polymerized mesogen layer 103 sandwiched between and aligned by a pair of photo-alignment layers 102, 112, each arranged on a substrate 101, 111, and each of the alignment layers having an anisotropic pattern corresponding to a polarization hologram recorded therein. Further, an electrode pair 104, 114 being patterned into a plurality of independently addressable domains 105, 106 is arranged to allow domain-wise application of an electrical field over the mesogen layer.

A color filter 107, separating incident light into a separate color (for example red, green or blue) for each of the independently addressable domains before entering the mesogen layer is also provided.

All domains (R, G, B) may have the same polarization grating pattern and the same thickness.

By properly choosing the voltage over each of the domains 105, 106, for each such domain, it is possible to control in what direction the light passing that domain will exit the grating.

By providing means for blocking light exiting at an angle out of the normal axis, essentially only the $0^{th}$ order transmission light may be visible to a user.

One embodiment of the present invention is a direct view transmissive display comprising a standard backlight as light source and a switchable polarization grating as described above. To block light exiting the grating at an angle out of the normal axis from reaching a user, the display device may also comprise a "privacy films" such as those commonly used on for example Cash Dispensing Bank Machines (ATM), which effectively blocks light with an angle of incidence at more than approximately 15°.

Another embodiment of the present invention is a projector display (such as a data projector) comprising a light source, a switchable polarization grating as described above and projection lens system. To block light exiting the grating at an angle out of the normal axis from reaching the lens system, the lens system is arranged at a distance from the polarization grating such that only $0^{th}$ order is transmitted, and not $1^{st}$ order diffracted light does hit the entry to the lens system.

One advantage with display devices based on this type of switchable polarization gratings is that they may operate directly on unpolarized light, in the contrary to for example conventional liquid crystal display devices. This leads to a significantly increased light efficiency, as no additional polarizers are needed.

Based on experimental data, we anticipate that conventional LCD drive-voltages (1V-3V) will be more than sufficient for the operation of such display devices, and that switching times (ON+OFF times) may be as low as 10 ms when using a conventional nematic mesogen composition. Optionally, ferro-electric or other liquid crystals may be used.

Yet another exemplary application of polarization gratings of the present invention is a polarizer which may receive unpolarized light and converting it to polarized light at a efficiency at higher than 50%, at least for a narrow band of wavelengths.

Figure 11:
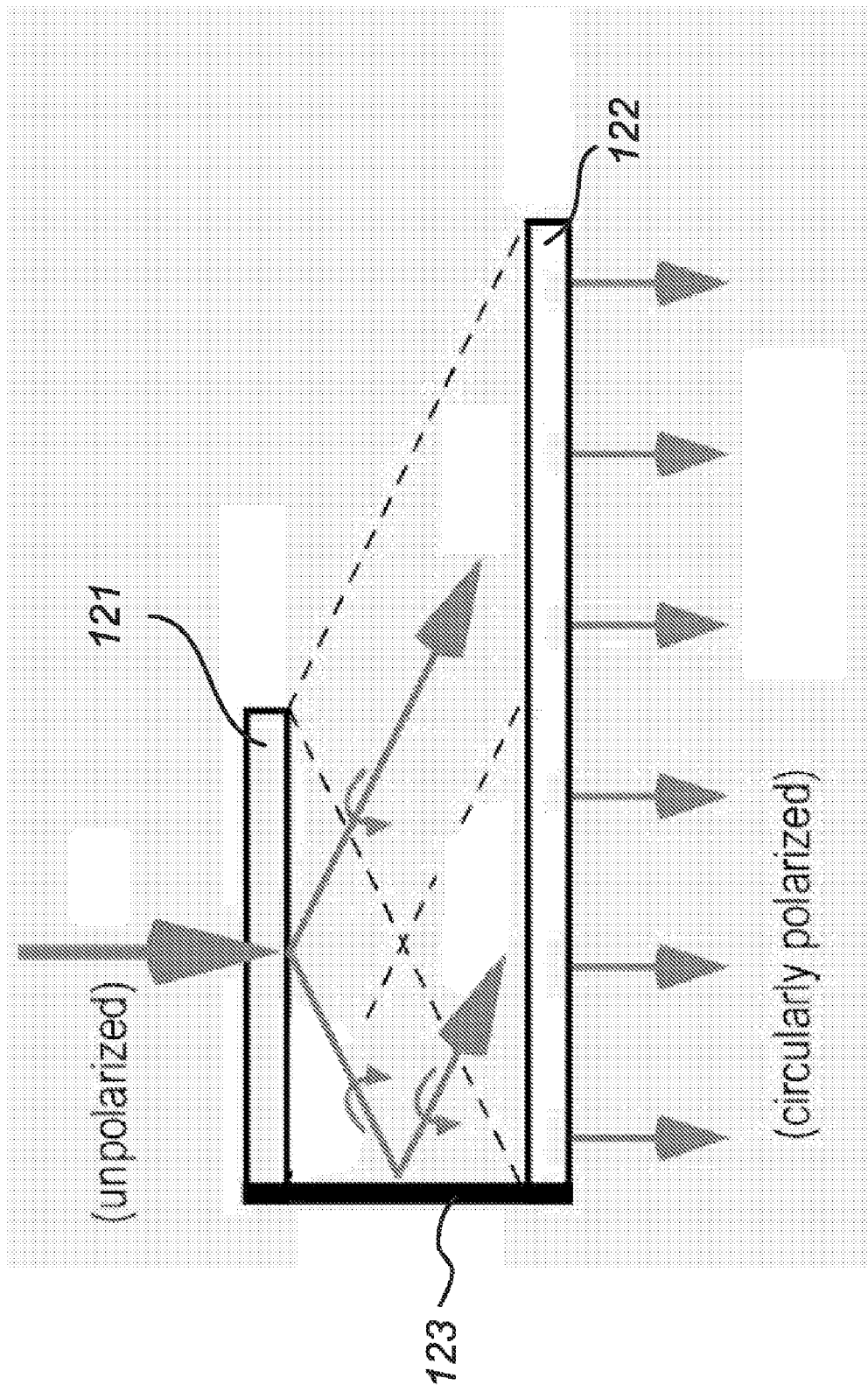
FIG. 11 illustrates an embodiment of a polarizer comprising a polarization grating.

One embodiment of a polarizer is shown in FIG. 11 comprising a first polarization grating 121, with a periodic optical axis pattern as recorded with two orthogonally circularly superimposed beams, which is used to diffract incident unpolarized light into two orthogonal circularly polarized beams of approximately 50% efficiency each.

The first beam travels through a transparent medium until it meets a second polarization grating 122 having the inverse nematic director pattern compared to the first polarization grating. The second beam reflects on a specular surface, for example a plane mirror 123 having its normal perpendicular to the normal of the grating. Upon reflection, the second beam changes its direction and polarization into the direction and polarization of the first beam, respectively. After reflection, the second beam also meets the second polarization grating.

The distance between the two gratings 121, 122 depends on the diffraction angle of the two beams, however, it is preferably large enough for only one of the beams from the first grating to meet the second grating without reflecting in the mirror. Furthermore, it is preferred that the second grating is large enough to collect all the beams diffracted by the first grating.

The two beams, now of the same direction and polarization, are diffracted by the second polarization grating into circularly polarized light, exiting the second grating through the normal axis. The light flux is unchanged, but the beam area is expanded. This however may be focused back using a lens system. Using a quarter-plate, the collimated circularly polarized light exiting the second grating may be transformed into linearly polarized light at high efficiencies.

Figure 12:
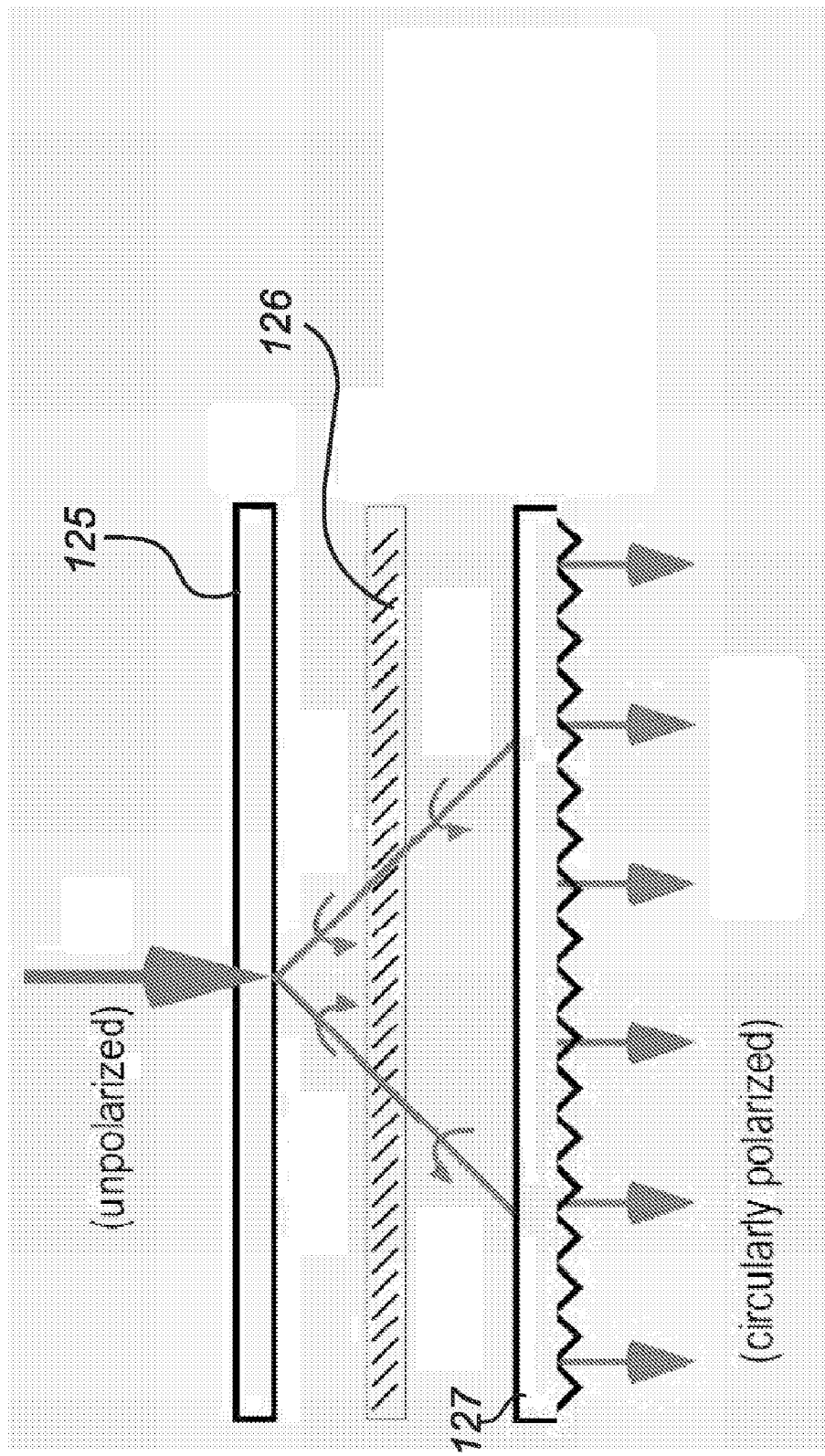
FIG. 12 illustrates another embodiment of a polarizer comprising a polarization grating.

Another embodiment of a polarizer is shown in FIG. 12. A polarization grating 125 with a spiraling optical axis pattern in linear polarization is used to incident unpolarized light into two orthogonal circularly polarized beams of approximately 50% efficiency each.

A highly tilted, uniaxial birefringent-layer 126 (slanted retarder) is arranged in the way of the two beams, to invert the polarization handedness of one of the beams, such that both beams, after passing the slanted retarder is of the same polarization, however in diverging directions.

Each of the two beams are then diverged by a prism 127 back to the direction of the normal of the polarization grating, forming a collimated beam of circularly polarized beams having an expanded beam area. Also in this embodiment, a lens system may be used to collect and focus the beam exiting the polarizer.

The prisms used for diverging the beams may be comprised in a sheet of symmetric prisms, as is shown in FIG. 12.

Yet another exemplary application for polarization gratings of the present invention relates to beam-splitters, and especially beam-splitters comprising an assemblies of more than one polarization gratings to obtain high diffraction angles, such as >45°, without the requirement for a small grating pitch.

If a single grating is used for this case, a pitch smaller than 1 µm is needed, according to the grating equation (for the first order and a grating in air):

$$\mathrm{Sin}(\theta_{IN})+\mathrm{Sin}(\theta_{OUT})=\lambda/\Lambda \tag{VI}$$

If two separate gratings are combined (with grating pitches $\Lambda_1$ and $\Lambda_2$) and light is normally incident, then the overall grating equation becomes:

$$\mathrm{Sin}(\theta_{OUT})=\lambda*(1/\Lambda_1+1/\Lambda_2) \tag{VII}$$

In this way, the term on the right hand side can be made larger simply by stacking two or more gratings (and not by reducing the pitch).

Figure 13:
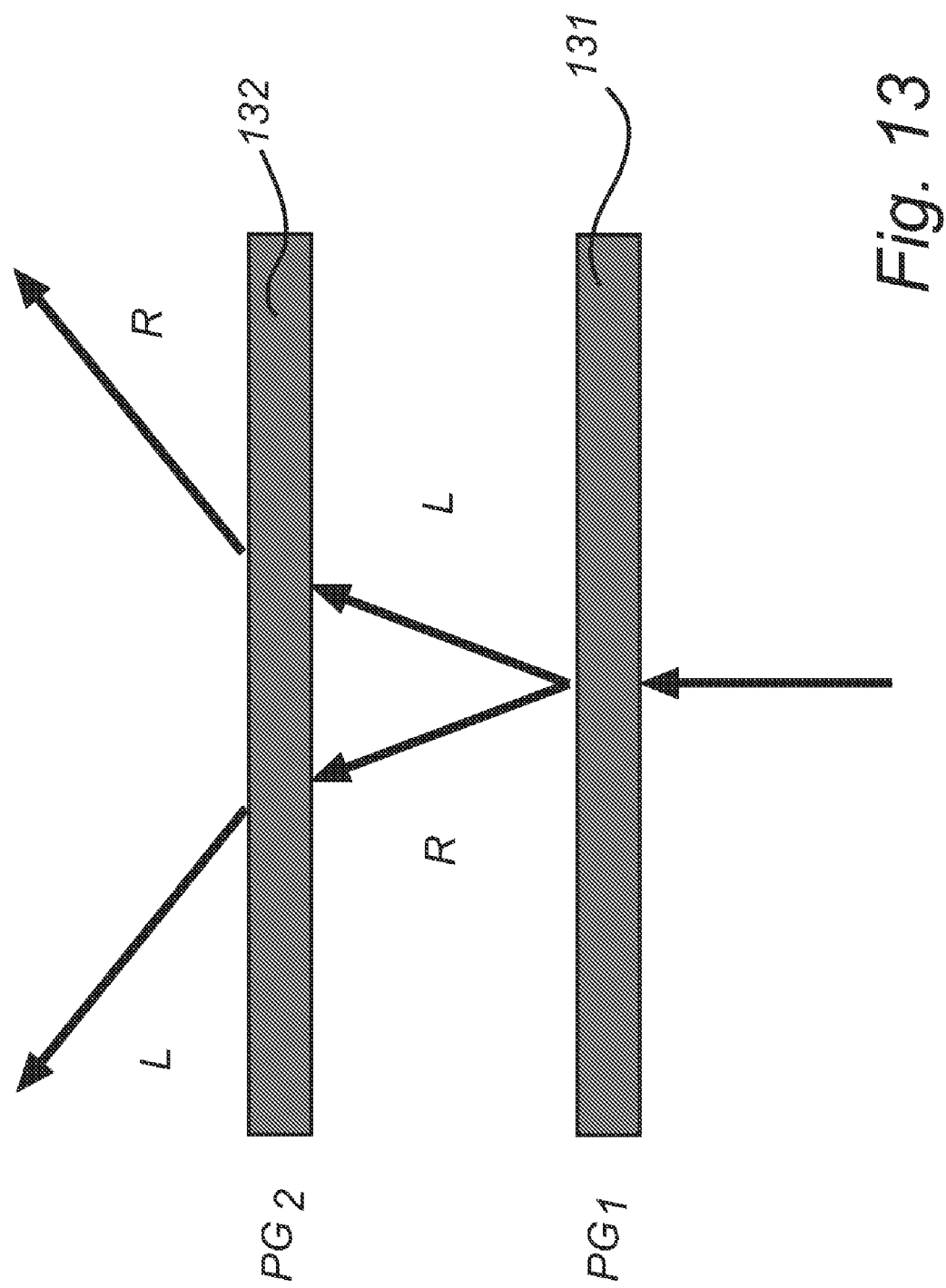
FIG. 13 illustrates a beam-splitter comprising two polarization gratings.

One embodiment of a beam-splitter is shown in FIG. 13, comprising a first polarization grating 131 and a second polarization grating 132 arranged on the first polarization grating, both gratings having a periodic optical axis pattern as recorded with two orthogonally circularly superimposed beams. However, the handedness of the first polarization grating 131 is opposite to the handedness 132 of the second polarization grating, in order to accomplish the ray diverging.

The first grating 131 diffracts incoming unpolarized light into a first, left-handed circularly polarized, component ($+1^{st}$ order diffraction) and a second, right-handed circularly polarized, component ($-1^{st}$ order diffraction at an angle (positive and negative, respectively) defined by formula (VI).

The second grating 132, being of opposite handedness, diffracts the first left-handed component from the first grating to a right-handed component, and diffracts the second, right-handed component into a left-handed component at angles defined by formula (VI). The combination of the two gratings gives a very high total diffraction angle.

A beam-splitter according to this embodiment may further comprise additional polarization gratings, to form a stack of polarization gratings of alternating handedness.

Further, one or more of the polarization gratings may be a switchable polarization grating as described above, allowing the beam-splitter to be turned on and off, or to be tuned to diffraction of light of a desired color.

Yet another exemplary application of polarization gratings of the present invention is in the area of security devices.

Polarization gratings may be employed in security devices in a multitude of ways. Aside from simply embedding a polarization grating of the invention by itself as the security device due to its novel polarization-dependent diffracting properties, there are at least two ways to form security devices with at least three "levels" of security.

Figure 14:
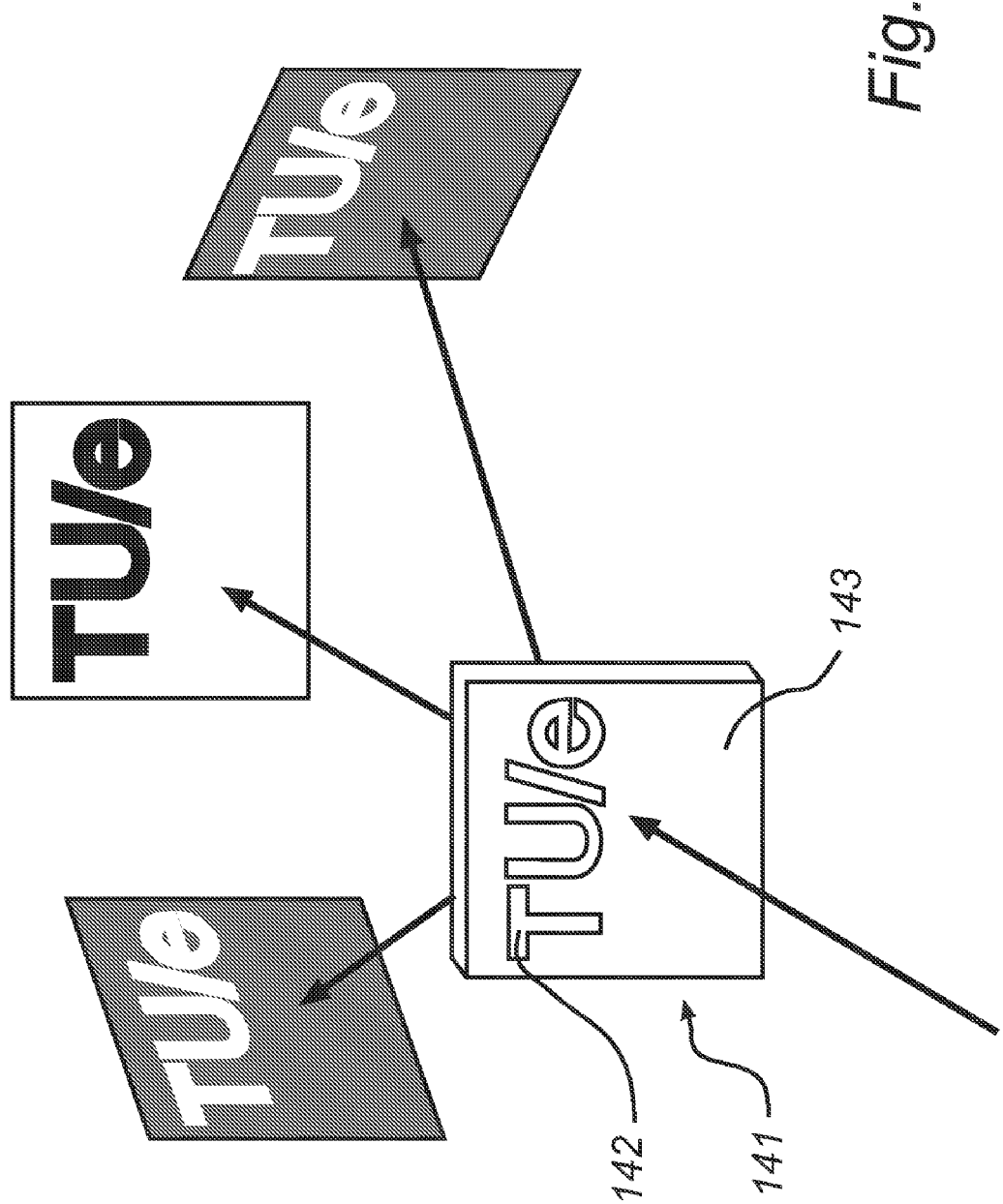
FIG. 14 illustrates an embodiment of a security device comprising a polarization grating.

In a first embodiment of such a security device, a transmitted and diffracted image may be patterned in a binary-fashion to present for example a biometric image, logotype, or alphanumeric information. A security device, and the essential operation of this embodiment is shown in FIG. 14. A transparent film 141 is patterned into different domains, where at least one domain 142 forms a desired image, in FIG. 14 represented by the text "TU/e".

The domain(s) of the film forming the image comprises a first polarization grating, for example a polarization grating with a periodic optical axis as recorded with two orthogonally circularly superimposed beams in linear polarization.

When the film is illuminated by white or monochromatic light, the embedded pattern ("TU/e" in this embodiment) will appear in the $0^{th}$, $+1^{st}$, and $-1^{st}$ diffracted directions in distinct ways. In this embodiment, the letters corresponds to domains 142 with a polarization grating of the present invention formed by orthogonal circular beams. These regions diffracts incident light strongly into the $\pm 1$ orders, and leads to dark lettering in the $0^{th}$ order. This dark lettering can be designed to a range of colors, depending on the retardation of the polarization grating. The domain 143 not forming the images correspond to regions formed with uniformly aligned LC alignment (no grating), so it does not diffract at all.

This embodiment therefore forms a security device that can be patterned with binary (halftone) images. The following features makes this embodiment different from previous grating designs for security features: (a) at most, three diffracted images are possible; (b) all the orders are polarized in very unique and controllable ways following the properties of the polarization grating.

All three major security "levels" apply to this technology: The security feature can be viewed with the naked eye and normal light ("level 1"), it can be viewed with polarized laser light and probed for polarization states ("level 2"), and the overall spectral properties can be measured with a spectrometer ("level 3"). There may be ways that are more complex as well.

In a second embodiment of a security device, the local polarization state of diffracted images may be patterned. The operation of a polarization grating as a security device according to this second embodiment is outlined in FIG. 15.

In a transparent film 151 of this embodiment also the background, i.e. the domains 153 of the film not forming the image is a polarization grating, however with a different optical axis pattern. For example, the non-image forming domain(s) 153 may be a polarization grating with an optical axis pattern as formed by recording with two orthogonal circularly polarized beams, and the image forming domain(s) 152 may be a polarization grating with an optical axis pattern as formed by recording with two orthogonal linearly polarized beams.

Figure 15B:
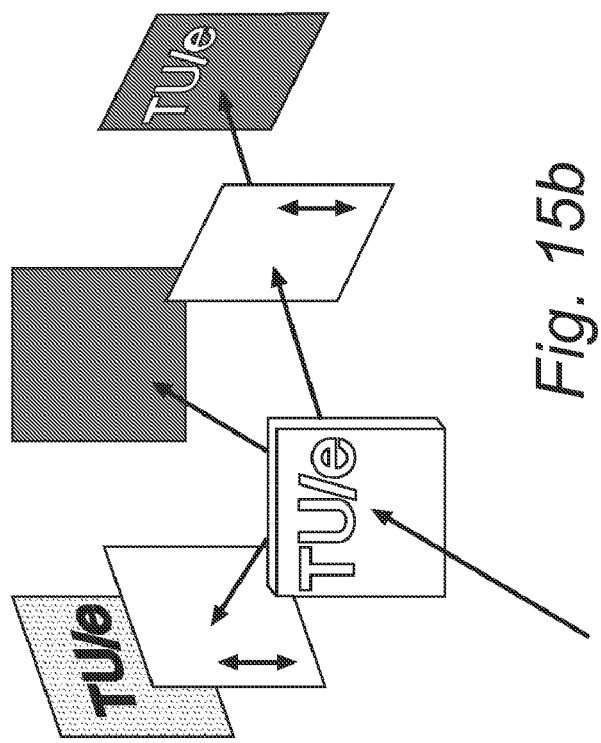
FIG. 15 illustrates another embodiment of a security device comprising a polarization grating.
Figure 15A:
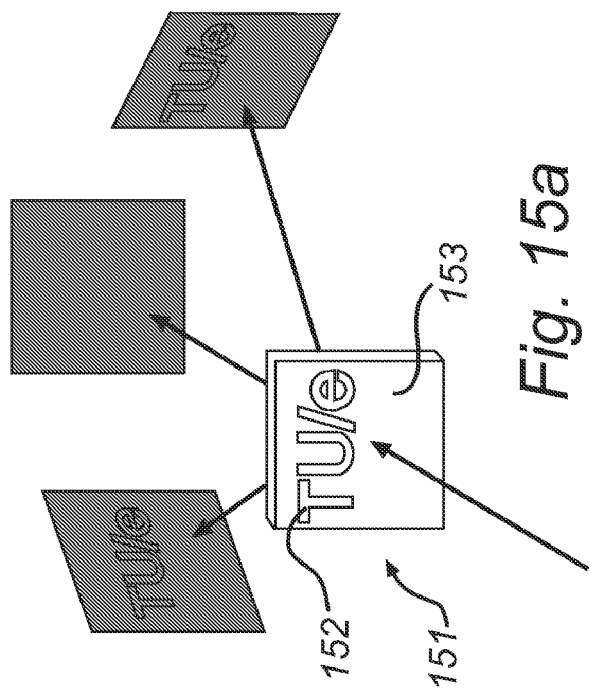

The film is illuminated by white or monochromatic light, and the embedded pattern ("TU/e") will at first appear faintly in the $+1^{st}$ and $-1^{st}$ diffracted images (FIG. 15a). Once a polarizer is placed in the diffracted images, high-contrast images appear (FIG. 15b).

It is possible to make the diffracted images grayscale in this embodiment by the choice of the polarization grating within each region. There is also the potential to design this feature for the higher orders ($\geq$ second diffracted orders).

In this embodiment, the letters corresponds to regions with a polarization grating formed by orthogonal linear beams. This region diffracts incident moderately into the $\pm 1$ orders. The non-letter background corresponds to regions formed with orthogonal circular beams, and diffracts incident light in a stronger fashion than the lettering regions. Both regions affect the $0^{th}$ order in the same way and do not affect the polarization state of the $0^{th}$ order, so this image will appear uniformly gray.

This second embodiment of a security feature may be patterned into grayscale images, where the same features as in the above embodiment make this different from all present security features, including: (a) three or more diffracted images are possible; (b) all the orders are polarized in very unique and controllable ways following the properties of the recording setup.

All three major security "levels" apply to this technology: The security feature can be viewed with the naked eye and normal light ("level 1"), it can be viewed with polarized laser light and probed for polarization states ("level 2"), and the overall spectral properties can be measured with a spectrometer ("level 3").

The present invention will now be further described in the following non-limiting examples.

EXAMPLES

Example 1

Manufacture of a Single Layer Polarization Grating

To obtain a polarization grating, a photo-alignment material Vantico Star-Align 2110 was spincast onto a borosilicate glass substrate to form a thin, ~50 nm, film.

The glass substrate was placed on a UV-absorber, a polycarbonate sheet and a index matching fluid film, to minimize back-surface reflections.

The photo-alignment film was then in a standard holographic setup exposed to two superimposed laser-beams of 351 nm at ~9 J/cm$^2$, one right handed and one left handed circularly polarized, each with an angle of incidence of 1.18°, and an angle of 2.36° separating the two beams. The polarization hologram formed in this holographic setup was thus recorded in the photo-alignment film.

Onto the photo-alignment layer, a polymerizable liquid crystal composition (RMM34 Eutectic mixture, Merck) was spincoated (Convac Spinner, 60 s at 2500 rpm) yielding a layer thickness of about 1.4 µm. To align the liquid crystal composition to the alignment pattern, the substrate with composition was annealed on a hot plate at 70° C. for 30 s. Thereafter, the liquid crystal composition was polymerized under a nitrogen environment with UV light (exposure with an Oriel lamp at 2.5 W/m$^2$, 2 min at room temperature followed by 2 min at 90° C.) to form a 1.87 µm thick solid film where the optical axis, the nematic directors of the mesogens, exhibits a periodical repeating "spiral" pattern.

Figure 3B:
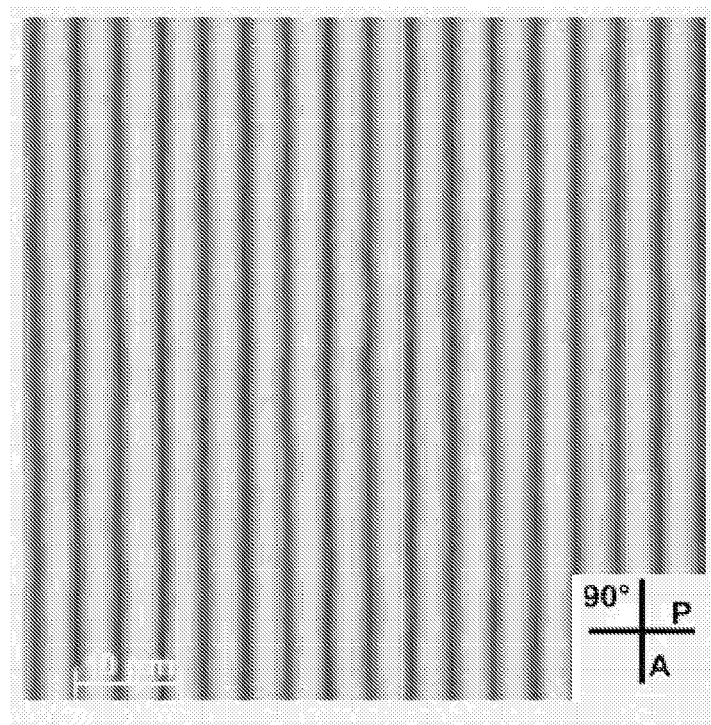
FIG. 3b is a photograph of a polarization grating as shown in FIG. 3a between crossed polarizers.

The resulting polarization grating was placed between two crossed polarizers, and a photograph of this is shown in FIG. 3b. The scale mark is 10 µm, and the grating period Λ is measured to ~8.1 µm.

Example 2

Manufacture of a Double Layer Polarization Grating

A polarization grating was manufactured as in example 1, as in example 1, however with an angle of 6.70° separating the beams.

Onto the photo-alignment layer, a polymerizable mesogen composition (RMM34, as in example 1) was aligned and polymerized to form a 1 µm thick solid film where the optical axis exhibits a repeating spiral pattern.

After polymerization of the first mesogen composition, a second mesogen composition (RMM34, as above) was coated onto the first, whereby it was aligned to the repeating spiral optical axis pattern of the first composition and polymerized to form a 1.2 µm thick solid layer.

Figure 5B:
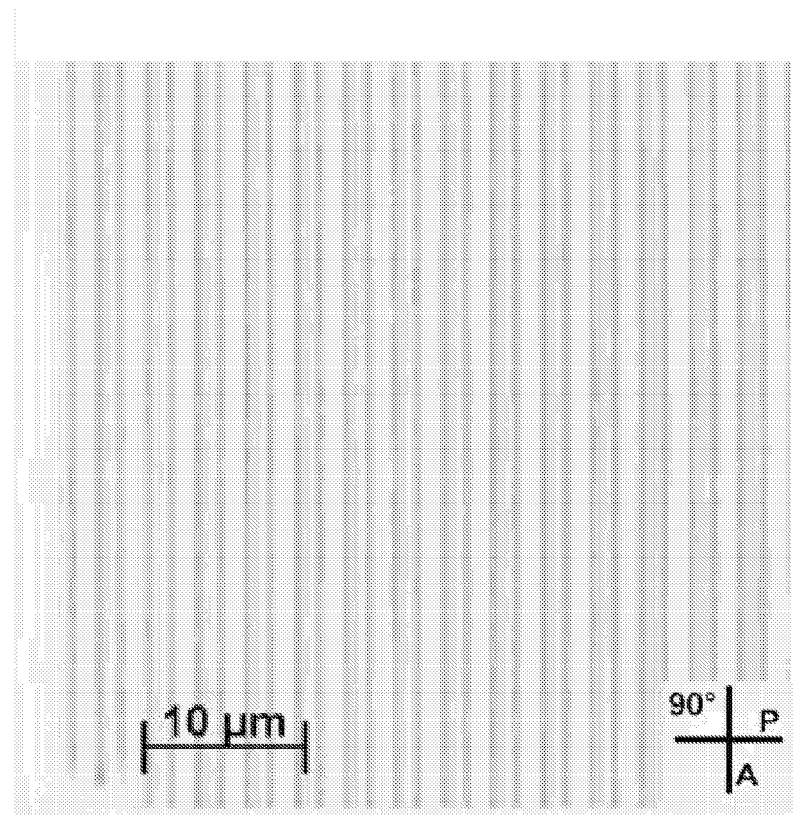
FIG. 5b is a photograph of a polarization grating as shown in FIG. 5a between crossed polarizers.

The resulting double layer film was placed between crossed polarizers, and a photograph of this is shown in FIG. 5b, where the scale mark is 10 µm, and the grating period Λ is ~3 µm.

The total thickness d of the formed polarization grating is 2.2 µm, and thus, this film widely exceeds the approximate limit of $d<\Lambda/2$.

This experiment has been further developed to arrange more than 20 liquid crystal compositions on top of each other with high optical quality in the resulting grating.

Example 3

Switchable Polarization Grating

Two borosilicate glass substrates was coated with a photo-alignment film as in example 1, and was arranged to as a closed cell structure with the alignment films facing each other. The cell spacing was 5.1 µm. The cell was filled with cyclohexane and then, in a standard holographic setup, exposed to two superimposed laser-beams of 351 nm at ~10 J/cm², one right handed and one left handed circularly polarized, with an angle of 2.28° separating the two beams.

The polarization hologram formed in this holographic setup was thus recorded in both the photo-alignment films. The cyclohexane was evaporated from the cell, and the cell was subsequently filled with a liquid crystal composition (E7, Merck), which was aligned by both the alignment films.

Figure 16:
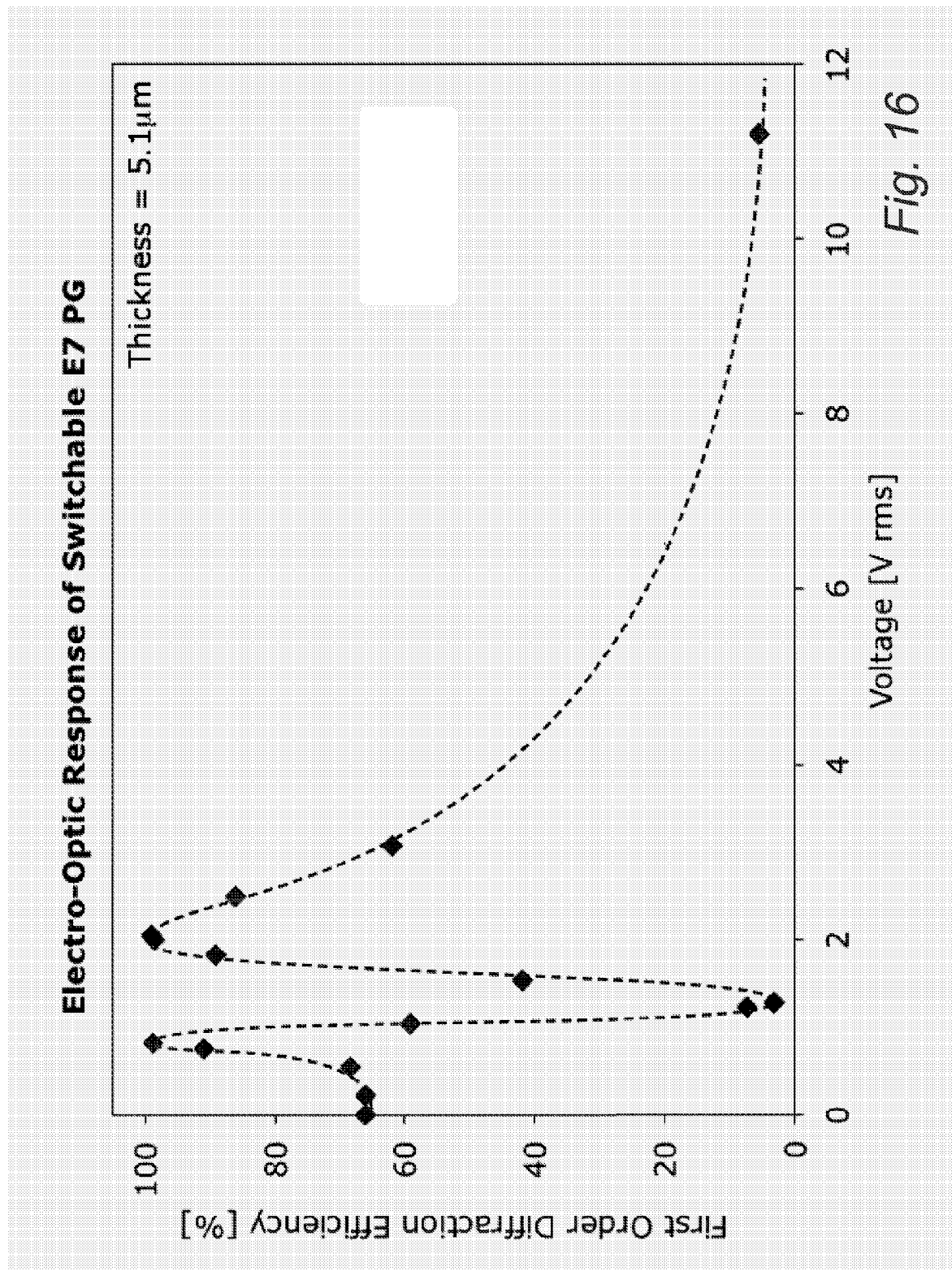
FIG. 16 shows the first order diffraction efficiency vs. voltage for a polarization grating.

A transparent electrode was arranged on the outside of each substrate, and light of 633 nm was passed through the cell. The first order diffraction efficiency was measured as a function of the voltage over the cell. The results for certain voltages between 0 V and 12 V is shown in FIG. 16, and as shown, the first order diffraction efficiency could readily be controlled between ~0 and ~100%

The invention claimed is:

1. A polarization grating comprising a polarization sensitive photo-alignment layer and at least a first and a second liquid crystal composition arranged on said alignment layer, wherein an anisotropic alignment pattern corresponding to a polarization hologram is arranged in said photo-alignment layer and wherein said first liquid crystal composition is arranged on and aligned by said alignment layer and at least partly polymerized, and wherein said second liquid crystal composition is arranged on and aligned by said first liquid crystal composition, and wherein both liquid crystal compositions have a layer thickness d which is determined by the following formula $$d \leq d_{max} = \Lambda/2$$

where d is the thickness of the layer and Λ is the pitch of the polarization grating.

2. The polarization grating according to claim 1, wherein the alignment direction of said anisotropic alignment pattern is periodic along at least one line in the plane of the alignment layer.

3. The polarization grating according to claim 2, wherein the alignment direction exhibits a periodic variation, which over one period corresponds to the polarization direction variation along a circle on the Poincaré sphere.

4. The polarization grating according to claim 2, wherein said alignment direction variation corresponds to a polarization direction variation in linear polarization.

5. The polarization grating according to claim 1, wherein said polymerizable liquid crystal composition comprises polymerizable mesogens.

6. The polarization grating according to claim 1, wherein said polymerizable liquid crystal composition is at least partly polymerized.

7. The polarization grating according to claim 1, comprising two photo-alignment layers being provided with an anisotropic alignment pattern of chemical bonds, said photo-alignment layers sandwiching and aligning said liquid crystal composition.

8. The polarization grating according to claim 1, wherein said liquid crystal composition further comprises a functional compound selected from the group consisting of absorbing dyes, fluorescent dyes, electroluminescent dyes, nano- and micro-particles having anisotropic shape and/or spectral properties, and any combination thereof.

9. The polarization grating according to claim 1, further comprising means for establishing an electric and/or magnetic field in said liquid crystal composition.

10. The polarization grating according to claim 1, wherein at least one of said first and said second polarization gratings is a polarization grating comprising a polarization sensitive photo-alignment layer and a liquid crystal composition arranged on said alignment layer, wherein an anisotropic alignment pattern corresponding to a polarization hologram is arranged in said photo-alignment layer and said liquid crystal composition is aligned by said alignment pattern.

11. The polarization grating according to claim 1, wherein a cholesteric liquid crystal composition is arranged between said first liquid crystal composition and said second liquid crystal composition, wherein said cholesteric liquid crystal composition exhibits a twist in the range of 30 to 60°.

12. The polarization grating according to claim 7, comprising a light source and electrode means for applying an electrical field in said polarization grating.

13. The polarization grating according to claim 12, wherein said electrode means is patterned into a plurality of domains, each domain being independently addressable.

14. The polarization grating according to claim 12, comprising a color filter arranged between said light source and said polarization grating.

15. The polarization grating according to claim 12, comprising a means for blocking light that is diffracted by said polarization grating into a diffraction order other than the zeroth diffraction order.

* * * * *